(12) United States Patent
Quynh et al.

(10) Patent No.: US 11,920,395 B2
(45) Date of Patent: Mar. 5, 2024

(54) HINGE MODULE AND FOLDABLE ELECTRONIC DEVICE INCLUDING THE SAME

(71) Applicant: Samsung Electronics Co., Ltd., Suwon-si (KR)

(72) Inventors: Nguyen Dinh Quynh, Thai Nguyen (VN); Tran Danh Tung, Thai Nguyen (VN); Dao Xuan Truong, Thai Nguyen (VN); Do Quang Thang, Thai Nguyen (VN); Nguyen Van Them, Thai Nguyen (VN); Nguyen Khac Cao, Thai Nguyen (VN)

(73) Assignee: Samsung Electronics Co., Ltd., Suwon-si (KR)

( * ) Notice: Subject to any disclaimer, the term of this patent is extended or adjusted under 35 U.S.C. 154(b) by 195 days.

(21) Appl. No.: 17/492,288

(22) Filed: Oct. 1, 2021

(65) Prior Publication Data

US 2022/0120124 A1  Apr. 21, 2022

(30) Foreign Application Priority Data

Oct. 20, 2020 (KR) .................. 10-2020-0136041

(51) Int. Cl.
  *E05D 3/12* (2006.01)
  *E05D 11/06* (2006.01)
  (Continued)

(52) U.S. Cl.
  CPC .............. *E05D 3/122* (2013.01); *E05D 11/06* (2013.01); *E05D 11/105* (2013.01); *F16C 11/04* (2013.01); *E05Y 2900/606* (2013.01)

(58) Field of Classification Search
  CPC .................... E05D 3/122; E05Y 2900/606
  See application file for complete search history.

(56) References Cited

U.S. PATENT DOCUMENTS

| 7,414,834 B2 * | 8/2008 | Ukonaho | .............. G06F 1/1681 |
| | | | 361/679.55 |
| 9,309,705 B2 * | 4/2016 | Hsu | .......................... E05D 3/122 |

(Continued)

*Primary Examiner* — Jason W San
(74) *Attorney, Agent, or Firm* — Jefferson IP Law, LLP

(57) ABSTRACT

A hinge module capable of fixing a first housing and a second at various opening angles and a foldable electronic device including the same are provided. The foldable electronic device includes a first housing, a second housing provided in a shape corresponding to a shape of the first housing, and a hinge module rotatably connecting the first housing to the second housing, the hinge module configured to fix the first housing and the second housing at a certain opening angle, wherein the hinge module includes a fixed gear fixed without rotation and configured to allow a rotation of a counterpart gear in a first direction, and limit a rotation of the counterpart gear in a second direction opposite to the first direction, a guiding gear configured to allow a rotation of a counterpart gear in the second direction and limit a rotation of the counterpart gear in the first direction, a first rotary gear configured to be engaged with the fixed gear, a second rotary gear configured to be engaged with the guiding gear, and an elastic member arranged between the first rotary gear and the second rotary gear, and providing an elastic force for the first rotary gear and the second rotary gear to move toward the fixed gear and the guiding gear, respectively.

20 Claims, 36 Drawing Sheets

(51) Int. Cl.
*E05D 11/10* (2006.01)
*F16C 11/04* (2006.01)

(56) References Cited

U.S. PATENT DOCUMENTS

| | | | | |
|---|---|---|---|---|
| 9,310,849 B2* | 4/2016 | Hsu | ............ | H04M 1/022 |
| 9,388,614 B2* | 7/2016 | Hsu | ............ | E05D 3/12 |
| 9,778,704 B2* | 10/2017 | Motosugi | ............ | G06F 1/1618 |
| 9,856,909 B1* | 1/2018 | Hsu | ............ | G06F 1/1681 |
| 10,000,955 B2* | 6/2018 | Shang | ............ | G06F 1/1681 |
| 10,152,094 B1* | 12/2018 | Holung | ............ | G06F 1/1681 |
| 10,480,226 B1* | 11/2019 | Chen | ............ | G06F 1/1681 |
| 10,928,864 B1* | 2/2021 | Sanchez | ............ | G06F 1/1681 |
| 2013/0139355 A1* | 6/2013 | Lee | ............ | G06F 1/1681 16/354 |
| 2013/0152342 A1* | 6/2013 | Ahn | ............ | F16C 11/04 16/354 |
| 2015/0227175 A1* | 8/2015 | Motosugi | ............ | G06F 1/1618 16/341 |
| 2015/0342068 A1* | 11/2015 | Su | ............ | H04M 1/022 16/354 |
| 2015/0362958 A1* | 12/2015 | Shang | ............ | E05D 3/122 16/334 |
| 2016/0010374 A1* | 1/2016 | Hsu | ............ | G06F 1/1681 74/414 |
| 2016/0187934 A1* | 6/2016 | Lee | ............ | E05D 3/06 361/679.56 |
| 2017/0328102 A1* | 11/2017 | Kato | ............ | E05D 11/1078 |
| 2018/0024596 A1* | 1/2018 | Park | ............ | G06F 1/1681 361/679.55 |
| 2018/0035565 A1* | 2/2018 | Hsu | ............ | F16H 19/04 |
| 2018/0119727 A1* | 5/2018 | Liu | ............ | G06F 1/1681 |
| 2020/0081501 A1* | 3/2020 | Lin | ............ | G06F 1/1681 |
| 2020/0257341 A1* | 8/2020 | Lin | ............ | E05D 3/122 |
| 2020/0291702 A1* | 9/2020 | Hsu | ............ | G06F 1/1681 |
| 2020/0409429 A1* | 12/2020 | Hsu | ............ | G06F 1/1681 |
| 2021/0156416 A1* | 5/2021 | Lin | ............ | G06F 1/1681 |
| 2021/0293270 A1* | 9/2021 | Zhu | ............ | F16C 11/04 |
| 2022/0377919 A1* | 11/2022 | Zhang | ............ | F16C 11/04 |
| 2022/0390989 A1* | 12/2022 | Hsu | ............ | F16C 11/04 |
| 2023/0026358 A1* | 1/2023 | Son | ............ | G06F 1/1652 |
| 2023/0273649 A1* | 8/2023 | Hsu | ............ | G06F 1/1681 16/354 |
| 2023/0279898 A1* | 9/2023 | Liu | ............ | F16C 11/04 361/807 |

\* cited by examiner

HINGE MODULE AND FOLDABLE ELECTRONIC DEVICE INCLUDING THE SAME

CROSS-REFERENCE TO RELATED APPLICATION(S)

This application is based on and claims priority under 35 U.S.C. § 119(a) of a Korean patent application number 10-2020-0136041, filed on Oct. 20, 2020, in the Korean Intellectual Property Office, the disclosure of which is incorporated by reference herein in its entirety.

BACKGROUND

1. Field

The disclosure relates to a hinge module and a foldable electronic device including the same.

2. Description of Related Art

A mobile electronic device, such as a smartphone, may provide various functions, such as a call, video playback, and Internet search, based on various types of applications. Users may desire to use the above-described various functions through a wider screen. However, as the screen becomes larger, portability may decrease. Accordingly, for a mobile electronic device, a foldable electronic device capable of increasing portability using a folding structure has been proposed.

In general, a foldable electronic device may include a first housing and a second housing that are provided to rotate between a folded position and an unfolded position.

In the foldable electronic device of the related art, the first housing and the second housing are provided to maintain an open state only in an unfolded position or only at a predetermined angle.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a hinge module capable of supporting a first housing and a second housing such that the first housing and the second housing maintain an open state at various angles, and a foldable electronic device including the same.

Additional aspects will be set forth in part in the description which follows and, in part, will be apparent from the description, or may be learned by practice of the presented embodiments.

According to an aspect of the disclosure, a foldable electronic device is provided. The foldable electronic device includes a first housing, a second housing provided in a shape corresponding to a shape of the first housing, and a hinge module rotatably connecting the first housing to the second housing, the hinge module configured to fix the first housing and the second housing at a certain opening angle, wherein the hinge module includes a fixed gear fixed without rotation and configured to allow a rotation of a counterpart gear in a first direction, and limit a rotation of the counterpart gear in a second direction opposite to the first direction, a guiding gear configured to allow a rotation of a counterpart gear in the second direction and limit a rotation of the counterpart gear in the first direction, a first rotary gear configured to be engaged with the fixed gear, a second rotary gear configured to be engaged with the guiding gear, and an elastic member arranged between the first rotary gear and the second rotary gear, and providing an elastic force for the first rotary gear and the second rotary gear to move toward the fixed gear and the guiding gear, respectively.

The hinge module may further include a shaft gear configured to pass through the fixed gear, the guiding gear, the first rotary gear, the second rotary gear, and the elastic member.

The shaft gear may include a first shaft gear serving as a rotation shaft of the first housing and a second shaft gear serving as a rotation shaft of the second housing.

The first rotary gear and the second rotary gear may be provided to advance and retreat in an axial direction of the shaft gear.

When a distance in which the first rotary gear advances and retreats with respect to the second rotary gear is g, and a height of the first rotary gear is h, the distance and the height may satisfy g≥h.

The first rotary gear may include a first coupling portion extending in a direction parallel to the axial direction of the shaft gear and having a cross section of an arc shape, and the second rotary gear may include a second coupling portion extending in a direction parallel to the axial direction of the shaft gear, and configured to form a circular cross section together with the first coupling portion by being coupled to the first coupling portion in the axial direction.

The first coupling portion may include guide protrusions formed to protrude outward from both sides of the first coupling portion, and the second coupling portion may include guide grooves formed to be recessed inward from both sides of the second coupling portion.

The guide protrusion may have a cross-sectional shape that corresponds to a cross-sectional shape of the guide groove.

The hinge module may include a rotating member provided to rotate together with the first housing or the second housing, a wing member provided to rotate together with the rotating member, and including the guiding gear, and a transmission shaft configured pass through each of the rotating member and the wing member to transmit a rotational force of the rotating member to the wing member.

The rotating member may include a transmission shaft hole formed to allow the transmission shaft to be inserted thereinto, the transmission shaft hole configured to limit a movement range of the transmission shaft such that a folding range of the first housing or the second housing is limited.

The hinge module may further include a link gear arranged between the first shaft gear and the second shaft gear to transmit the rotation of the first shaft gear to the second shaft gear or transmit the rotation of the second shaft gear to the first shaft gear.

When the shaft gear rotates in the first direction, the first rotary gear may rotate relative to the fixed gear in the first direction, and the second rotary gear and the guiding gear may rotate together with the first rotary gear in the first direction.

When the shaft gear rotates in the second direction, the fixed gear, the first rotary gear and the second rotary gear may be fixed, and the guiding gear may rotate relative to the second rotary gear in the second direction.

When the first rotary gear rotates relative to the fixed gear in the first direction, the first rotary gear may move toward the second rotary gear.

When the guiding gear rotates relative to the second rotary gear in the second direction, the second rotary gear may move toward the first rotary gear.

In accordance with another aspect of the disclosure, a hinge module rotatably connecting a first housing to a second housing is provided. The hinge module includes a fixed gear fixed without rotation and configured to allow a rotation of a counterpart gear in a first direction, and limit a rotation of the counterpart gear in a second direction opposite to the first direction, a guiding gear configured to allow a rotation of a counterpart gear in the second direction and limit a rotation of the counterpart gear in the first direction, a first rotary gear configured to be engaged with the fixed gear, a second rotary gear configured to be engaged with the guiding gear, and an elastic member arranged between the first rotary gear and the second rotary gear, and providing an elastic force for the first rotary gear and the second rotary gear to move toward the fixed gear and the guiding gear, respectively.

When the shaft gear rotates in the first direction, the first rotary gear may rotate relative to the fixed gear in the first direction, and the second rotary gear and the guiding gear may rotate together with the first rotary gear in the first direction.

When the shaft gear rotates in the second direction, the fixed gear, the first rotary gear and the second rotary gear may be fixed, and the guiding gear may rotate relative to the second rotary gear in the second direction.

When the first rotary gear rotates relative to the fixed gear in the first direction, the first rotary gear may move toward the second rotary gear, and when the guiding gear rotates relative to the second rotary gear in the second direction, the second rotary gear may move toward the first rotary gear.

In accordance with another aspect of the disclosure, a foldable electronic device is provided. The foldable electronic device includes a first housing, a second housing provided in a shape corresponding to a shape of the first housing, and a hinge module rotatably connecting the first housing to the second housing, the hinge module configured to fix the first housing and the second housing at a certain opening angle, wherein the hinge module includes a first fixed gear fixed without rotation and configured to allow a rotation of a counterpart gear in a first direction, and limit a rotation of the counterpart gear in a second direction opposite to the first direction, a second fixed gear fixed together with the first fixed gear and configured to limit a rotation of a counterpart gear in the first direction, and allow a rotation of the counterpart gear in the second direction, a first guiding gear provided to rotate together with the first housing and configured to allow a rotation of a counterpart gear in the second direction and limit a rotation of the counterpart gear in the first direction, a second guiding gear provided to rotate together with the second housing and configured to limit a rotation of a counterpart gear in the first direction and limit a rotation of the counterpart gear in the second direction, a first rotary gear unit including a first gear engaged with the first fixed gear, a second gear engaged with the first guiding gear, and a first elastic member arranged between the first gear and the second gear, and a second rotary gear unit including a third gear engaged with the second fixed gear, a third gear engaged with the second guiding gear, and a second elastic member arranged between the third gear and the fourth gear.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
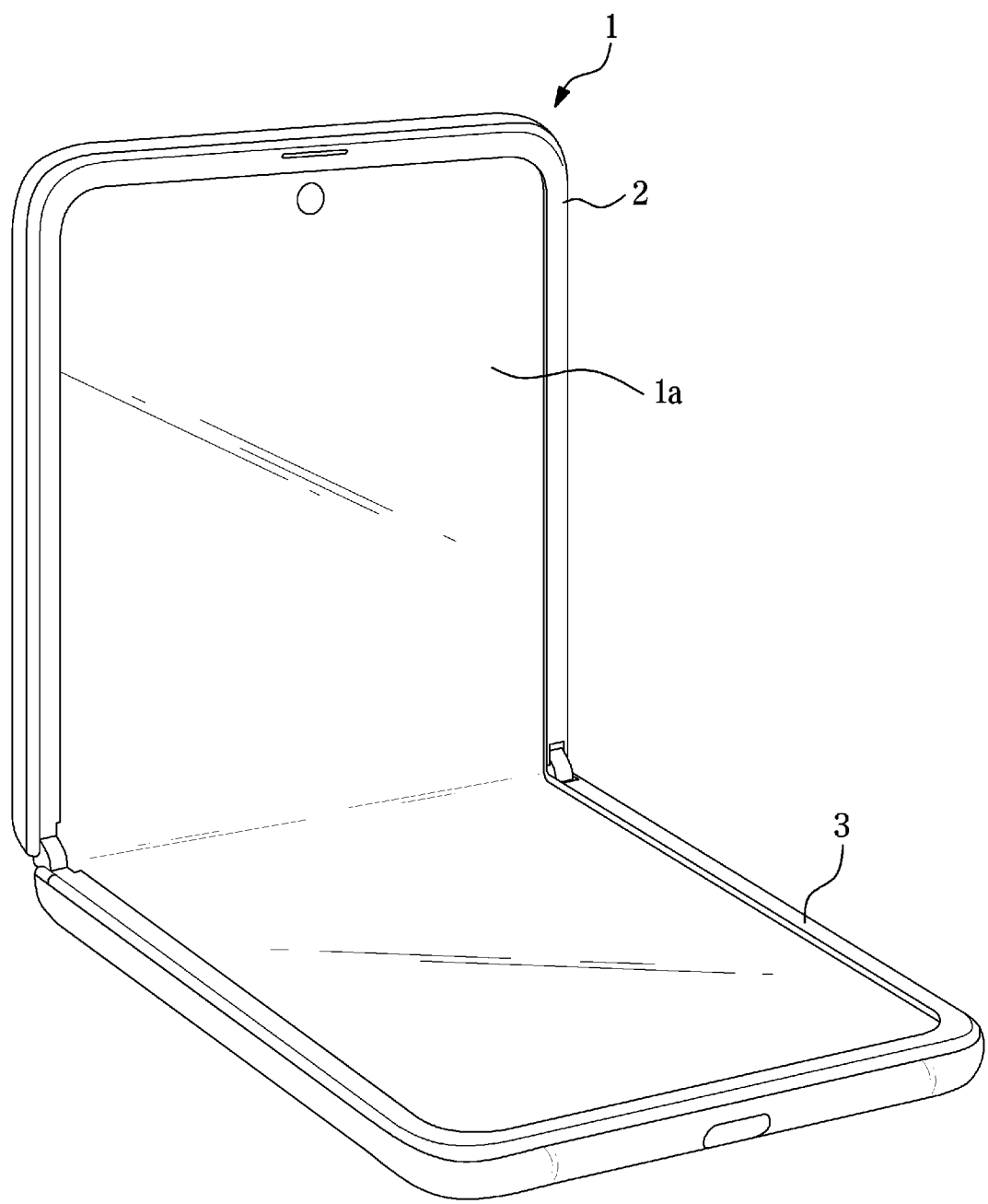
FIG. 1 is a perspective view illustrating a foldable electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the drawings, like reference numerals refer to like parts or components.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "include", "comprise" and/or "have" when used in this specification, specify the presence of stated features, integers, operations, elements, and/or components, but do not preclude the presence or addition of one or more other features, integers, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or section discussed below could be termed a second element, component, region, layer or section without departing from the teachings of the disclosure. Descriptions shall be understood as to include any and all combinations of one or more of the associated listed items when the items are described by using the conjunctive term "~ and/or ~," or the like.

The terms "front", "rear", "left", and "right" as herein used are defined with respect to the drawings, but the terms may not restrict the shape and position of the respective components.

Hereinafter, an embodiment according to the disclosure will be described with reference to the accompanying drawings.

FIG. 1 is a perspective view illustrating a foldable electronic device according to an embodiment of the disclosure.

Figure 2:
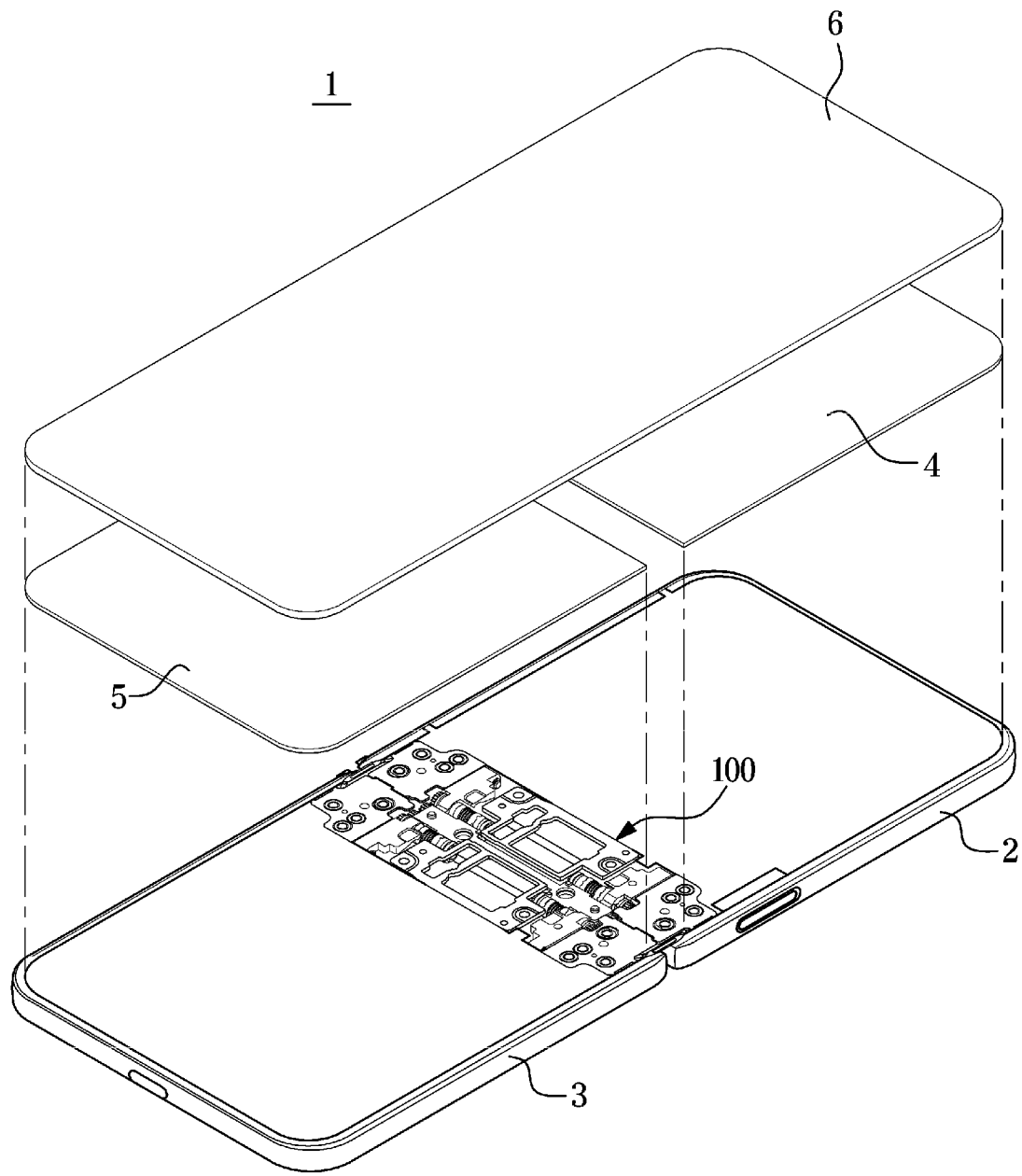
FIG. 2 is a view illustrating a coupling relationship between some components in a foldable electronic device according to an embodiment of the disclosure.

FIG. 2 is a diagram illustrating a coupling relationship between some components in a foldable electronic device according to an embodiment of the disclosure.

According to an embodiment of the disclosure, a foldable electronic device 1 may maintain a folded state (or a folding state), an unfolded state (or a flat state or an unfolding state), and an open state at various angles between the folded state and the unfolded state.

FIG. 1 illustrates a state in which the foldable electronic device 1 is opened at a certain angle. A foldable electronic device of the related art may be unfolded from a folded state to an unfolded state or may be folded from an unfolded state to a folded state, but may not maintain an open state at a certain position between the folded state and the unfolded state. In addition, another foldable electronic device of the related art is provided to maintain an open state between a folded state and an unfolded state, but is limited in an opening angle capable of maintaining the open state.

According to an aspect, the foldable electronic device 1 may not only maintain a folded state and an unfolded state but also maintain an open state at various angles between the folded state and the unfolded state. The foldable electronic device 1 may maintain an open state at a certain position between a folded position and an unfolded position. Accordingly, the user may use the foldable electronic device 1 that is opened at a desired angle. Accordingly, the user convenience may be improved.

Referring to FIG. 1, the foldable electronic device 1 includes a first housing 2, a second housing 3 connected to be rotatable relative to the first housing 2, and a screen display area 1a formed on one surfaces of the first housing 2 and the second housing 3. The screen display area 1a may include flat areas and a bendable area, the flat areas are provided to correspond to the first housing 2 and the second housing 3, respectively, and the bendable area may be provided between the first housing 2 and the second housing 3.

Referring to FIG. 2, a flexible display panel 6 of the foldable electronic device 1 will be described.

The foldable electronic device 1 includes the first housing 2 and the second housing 3 separated from each other, and a hinge module 100 rotatably connecting the first housing 2 to the second housing 3.

The foldable electronic device 1 may include a first support panel 4 provided to cover the front surface of the first housing 2 and a second support panel 5 provided to cover the front surface of the second housing 3. In addition, the foldable electronic device 1 may include the flexible display panel 6 provided to cover the first support panel 4 and the second support panel 5.

The first support panel 4 and the second support panel 5 may be provided to be flat. The first support panel 4 and the second support panel 5 may be provided to correspond to the flat areas of the flexible display panel 6. The flexible display panel 6, which is formed of a flexible material, may allow the first support panel 4 and the second support panel 5 to be at an inner side of the flexible display panel 6 to form the flat areas. A predetermined separation space may be formed between the first support panel 4 and the second support panel 5, and a portion of the flexible display panel 6 covering the separation space may form the bendable area.

The first support panel 4 and the second support panel 5 may be attached to the front surface of the first housing 2 and the front surface of the second housing 3 through an adhesive, respectively. The adhesive may include a double-sided tape and an adhesive resin, and the type thereof is not limited.

The flexible display panel 6 may be provided together with a transparent protection panel. The flexible display panel 6 may be bonded to the front surfaces of the first support panel 4 and the second support panel 5 through an adhesive. The flexible display panel 6 may extend from the front surface of the first housing 2 to the front surface of the second housing 3. The adhesive may include a double-sided tape and an adhesive resin, and the type thereof is not limited.

In addition, although the first housing 2 and the second housing 3 are illustrated as having an approximately square shaped front surface in the drawing, the first housing and the second housing having a rectangular front surface may be provided, and the hinge module may be arranged between the long sides of the first housing and the second housing.

Figure 3:
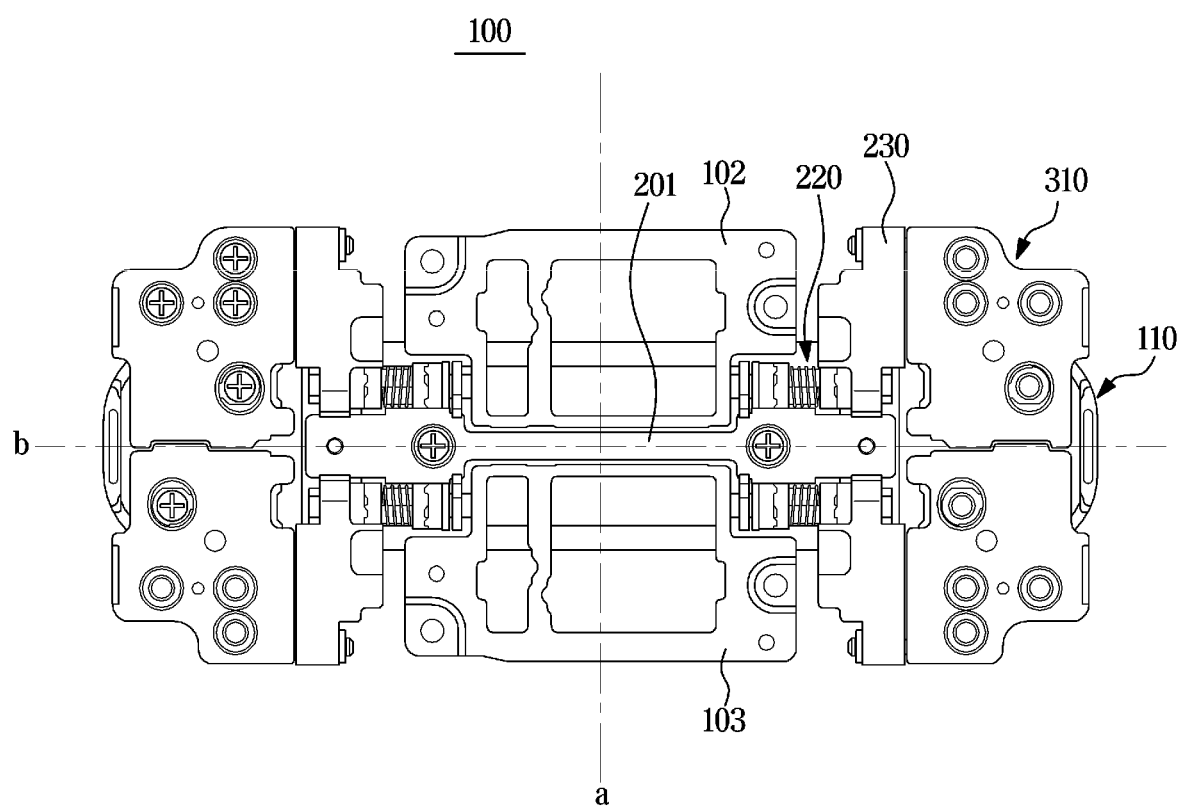
FIG. 3 is a view separately illustrating a hinge module from a foldable electronic device according to an embodiment of the disclosure.

FIG. 3 is a view separately illustrating a hinge module from a foldable electronic device according to an embodiment of the disclosure.

Figure 4:
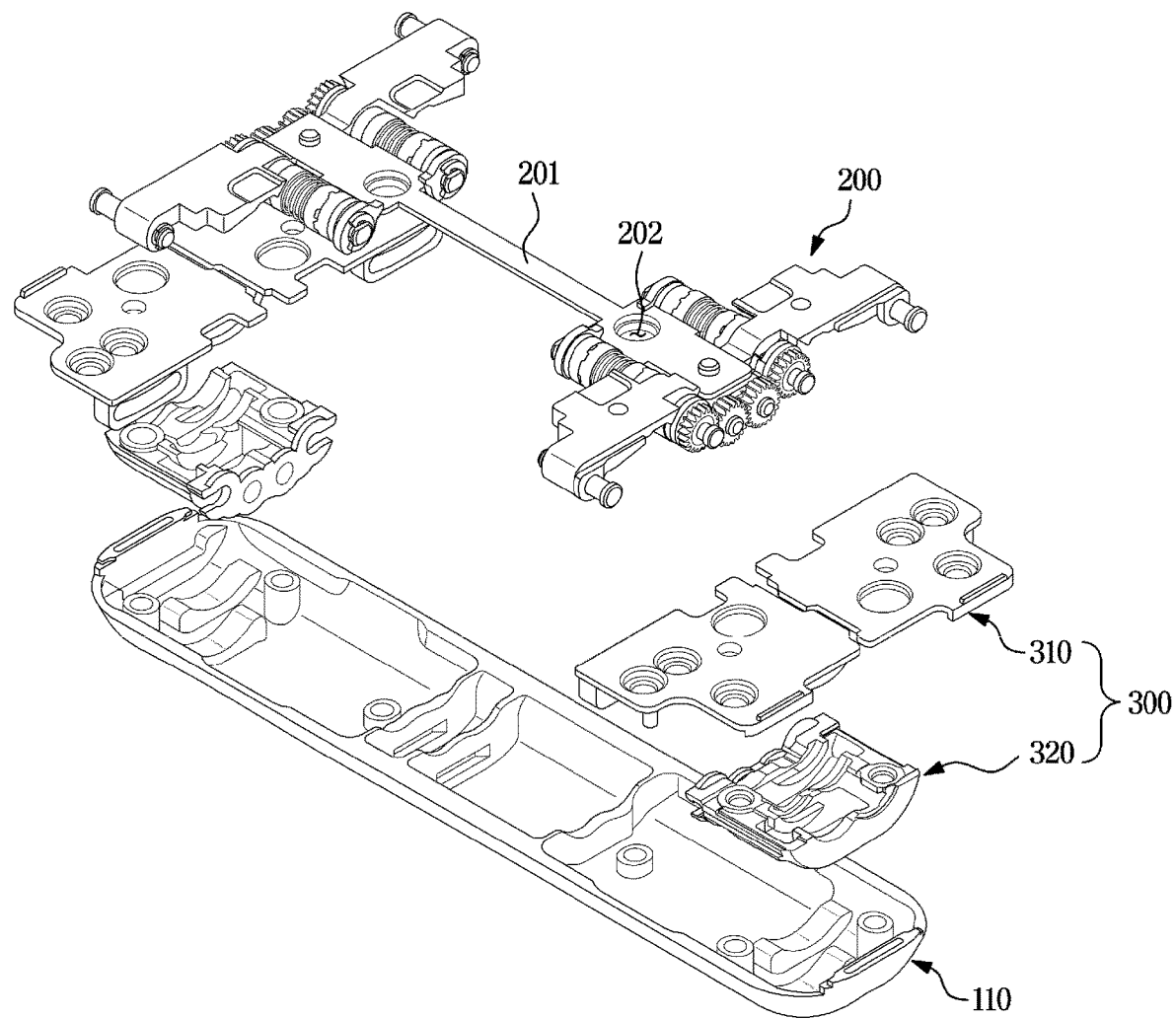
FIG. 4 is a schematic exploded view illustrating a hinge module according to an embodiment of the disclosure.

FIG. 4 is a schematic exploded view illustrating a hinge module according to an embodiment of the disclosure.

Referring to FIG. 3, according to an embodiment of the disclosure, the hinge module 100 may be provided to be substantially symmetrical with respect to each of virtual lines a and b. The reason for being substantially symmetrical with respect to the virtual line a is to improve the coupling force of the first housing 2 and the second housing 3. The reason for being substantially symmetrical with respect to the virtual line b is to provide the rotation shafts of the first housing 2 and the second housing 3 at positions spaced apart from each other by a predetermined distance based on the virtual line b.

Referring to FIG. 3, the hinge module 100 may include a first support member 102 and a second support member 103 provided to support the flexible display panel 6 when the flexible display panel 6 is unfolded to be flat. The first support member 102 and the second support member 103 may structurally prevent the first housing 2 and the second housing 3 from being twisted while being rotated together with a rotating member 310 which will be described below.

The hinge module 100 includes a shaft module 200 that allows the first housing 2 and the second housing 3 to maintain various opening angles, a rotation connection member 300 for connecting the first housing 2 and the second housing 3 to the shaft module 200, and a cover member 110 for preventing the shaft module 200 and the rotation connection member 300 from being exposed to the outside.

According to an embodiment of the disclosure, the shaft module 200 may include a connection bar 201. The connection bar 201 may be provided to connect components of the shaft module 200 that are provided with the same structure. The connection bar 201 may include a fastening hole 202 provided to fasten the connection bar 201 to the cover member 110. Although not shown in the drawings, the connection bar 201 may be coupled to the cover member 110 by a fastening member passing through the fastening hole 202 to be fastened to a fastening portion of the cover member 110.

Referring to FIG. 4, the rotation connection member 300 may include a rotating member 310 and a rotation bracket 320. The rotating member 310 may be coupled to the first housing 2 or the second housing 3 to rotate together with the first housing 2 or the second housing 3. The rotation bracket 320 may be provided to accommodate the rotating member 310 and guide the rotation of the rotating member 310. The rotating member 310 may not only be connected to the first housing 2 or the second housing 3, but may also be connected to the shaft module 200 to deliver rotation of the first housing 2 or the second housing 3 to the shaft module 200.

Figure 5:
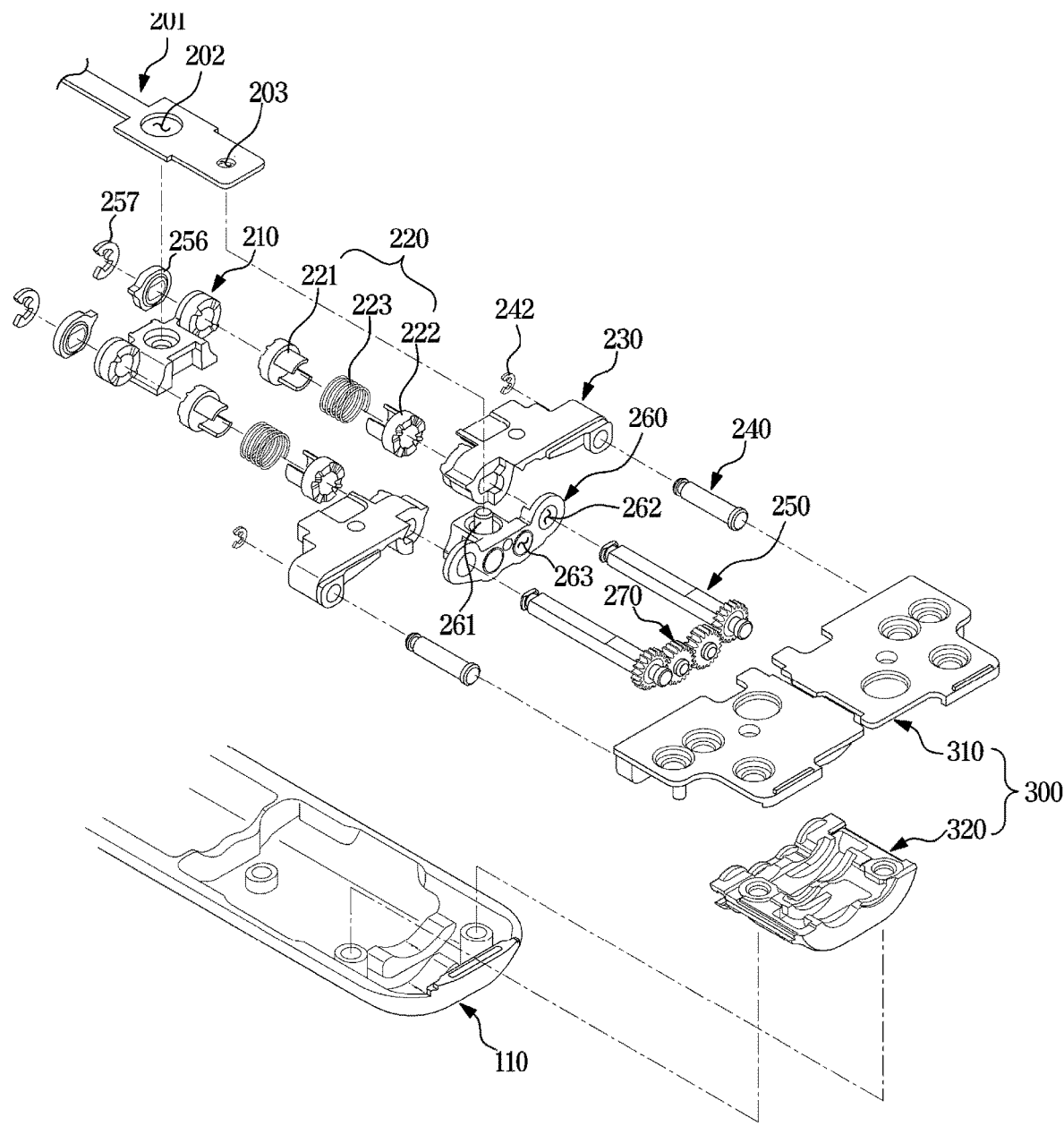
FIG. 5 is an exploded view illustrating a hinge module according to an embodiment of the disclosure.

FIG. 5 is an exploded view illustrating a hinge module according to an embodiment of the disclosure.

Referring to FIG. 5, components of the hinge module according to an embodiment of the disclosure will be described.

As described above, the hinge module 100 may include the shaft module 200, the rotation connection member 300, and the cover member 110.

As illustrated in FIG. 5, the shaft module 200 may include a connection bar 201, a fixed bracket 210, a rotary gear unit 220, a wing member 230, a transmission shaft 240, a shaft gear 250, a link gear bracket 260, and a link gear 270. Details of each component of the shaft module 200 will be described below.

Figure 6:
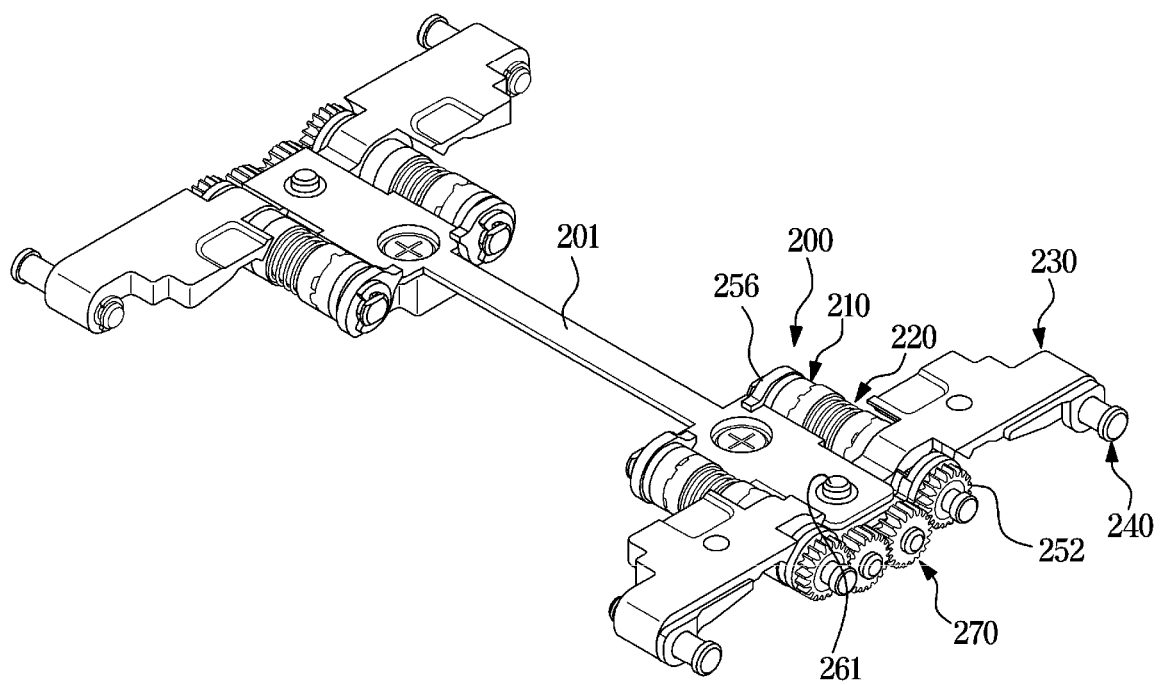
FIG. 6 is a view separately illustrating a shaft module from a hinge module shown according to an embodiment of the disclosure.

FIG. 6 is a view separately illustrating a shaft module from a hinge module according to an embodiment of the disclosure.

Figure 7:
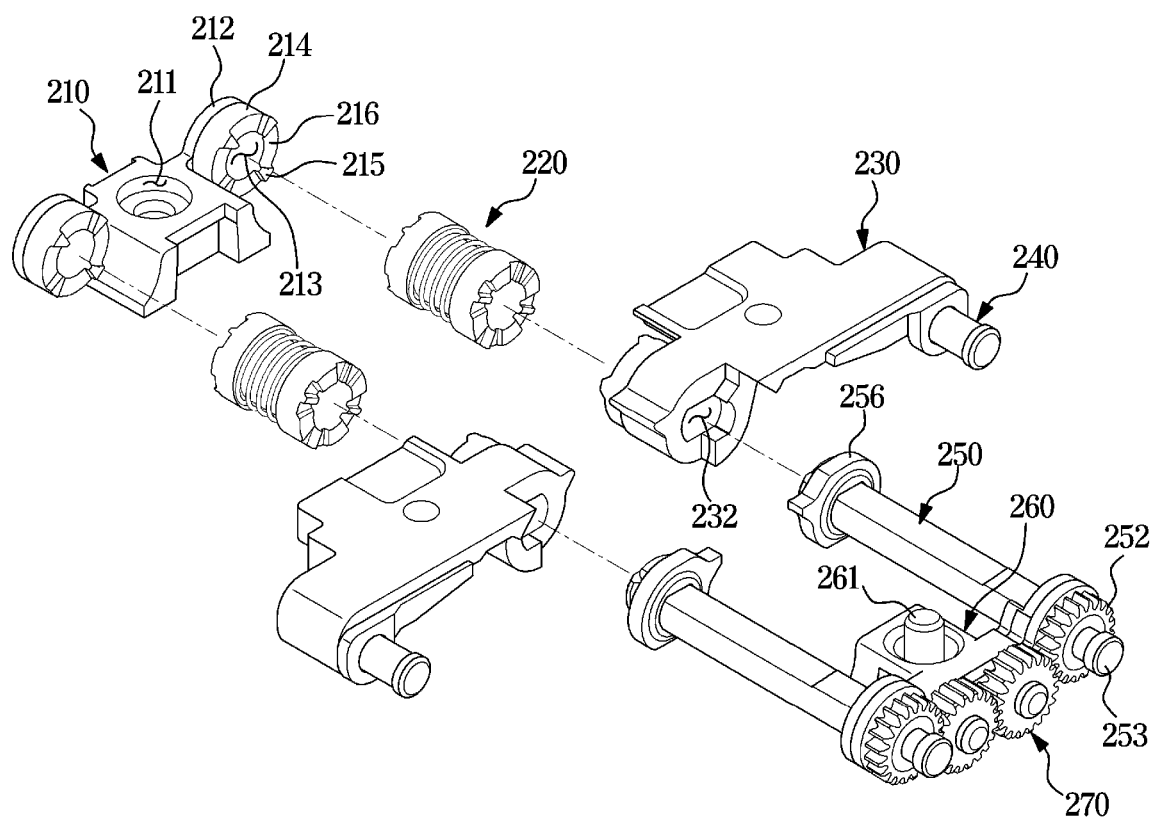
FIG. 7 is a schematic exploded view illustrating a shaft module according to an embodiment of the disclosure.

FIG. 7 is a schematic exploded view illustrating a shaft module according to an embodiment of the disclosure.

Referring to FIGS. 6 and 7, the shaft module 200 may include the fixed bracket 210 fixed to the cover member 110, the wing member 230 provided to rotate together with the rotating member 310, the rotary gear unit 220 provided between the fixed bracket 210 and the wing member 230, the transmission shaft 240 connecting the rotating member 310 to the wing member 230, the shaft gear 250 passing through the fixed bracket 21, the rotary gear unit 220, and the wing member 230, and the link gear bracket 260 on which the shaft gear 250 and the link gear 270 are mounted.

The fixed bracket 210 may be provided to be fixed to the cover member 110. As the fixed bracket 210 is fixed to the cover member 110, the position may be fixed regardless of the rotation of the first housing 2 and the second housing 3.

The fixed bracket 210 may include a fixing hole 211 provided to fix the fixed bracket 210 to the cover member 110. In addition, the fixed bracket 210 may include a shaft support portion 212 including a fifth shaft hole 213 through which the shaft gear 250 passes. According to an embodiment of the disclosure, the shaft support portion 212 may be provided in a pair, and may be formed to extend from both sides of a body of the fixed bracket 210 in which the fixing hole 211 is provided. The shaft support portion 212 may be coupled to a fixed gear 214.

The fixed gear 214 may include a fixing protrusion 215 that protrudes in a direction in which the shaft gear 250 extends. The fixed gear 214 may include a plurality of fixing protrusions 215 spaced apart from each other in the circumferential direction of the fixed gear 214. For example, the fixed gear 214 may include four fixing protrusions 215.

The fixed gear 214 may include a flat surface 216 formed between fixing protrusions 215 adjacent to each other. The fixing protrusion 215 may be formed to protrude from the flat surface 216 in the axial direction of the shaft gear 250.

The wing member 230 may include a second shaft hole 232 through which the shaft gear 250 passes. According to an embodiment of the disclosure, the wing member 230 may be provided in a pair. The transmission shaft 240 may be coupled to the wing member 230.

The shaft gear 250 may include a gear body 251 and a gear portion 252 provided at one end of the gear body 251. A fixing pin 256 may be coupled to the other end of the shaft gear 250. According to an embodiment of the disclosure, the shaft gear 250 may be provided in a pair. The link gear 270 may be provided between a pair of gear portions 252 such that the pair of shaft gears 250 rotate together.

The link gear 270 and the shaft gear 250 may be mounted on the link gear bracket 260. The link gear bracket 260 may include a first shaft hole (262 in FIG. 5) into which the shaft gear 250 is inserted, and a link gear hole (263 in FIG. 5) into which the link gear 270 is inserted. The link gear bracket 260 may include a bracket protrusion 261 provided to be inserted into a hole (203 in FIG. 5) provided in the connection bar 201. By inserting the bracket protrusion 261 into the hole 203, the position of the link gear bracket 260 may be stably fixed.

Figure 8:
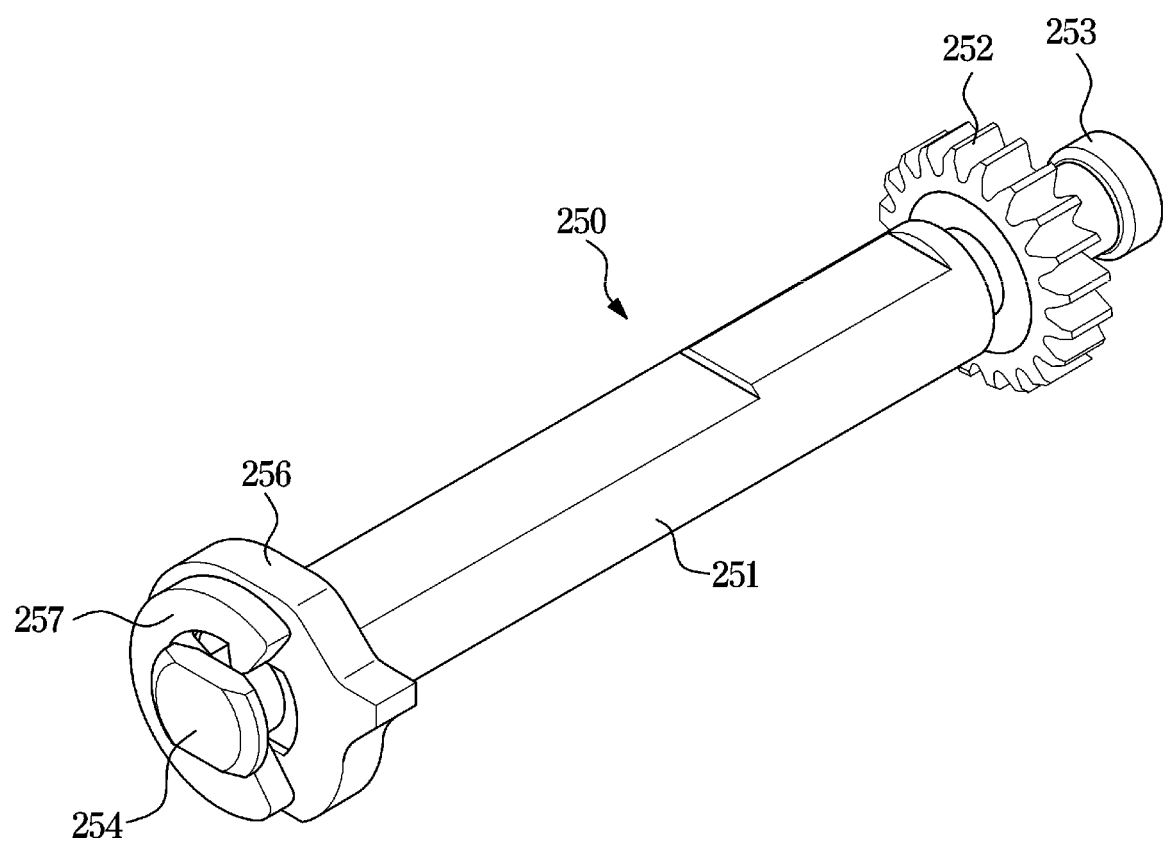
FIG. 8 is a view separately illustrating a shaft gear from a hinge module according to an embodiment of the disclosure.

FIG. 8 is a view separately illustrating a shaft gear from a hinge module according to an embodiment of the disclosure.

Referring to FIG. 8, the shaft gear 250 may include the gear body 251 and the gear portion 252. The gear portion 252 may be arranged adjacent to one end 253 of the gear body 251. An E-ring 257 may be coupled to the other end 254 of the gear body 251, and the other end 254 of the gear body 251 may be formed with a groove (not shown) to which the E-ring 257 may be coupled. In addition, the fixing pin 256 may be coupled to the gear body 251 to prevent the E-ring 257 from moving in the axial direction of the shaft gear 250.

According to an embodiment of the disclosure, the gear body 251 may be provided in a D-cut shape so as not to rotate relative to the second shaft hole 232 of the wing member 230.

Figure 9:
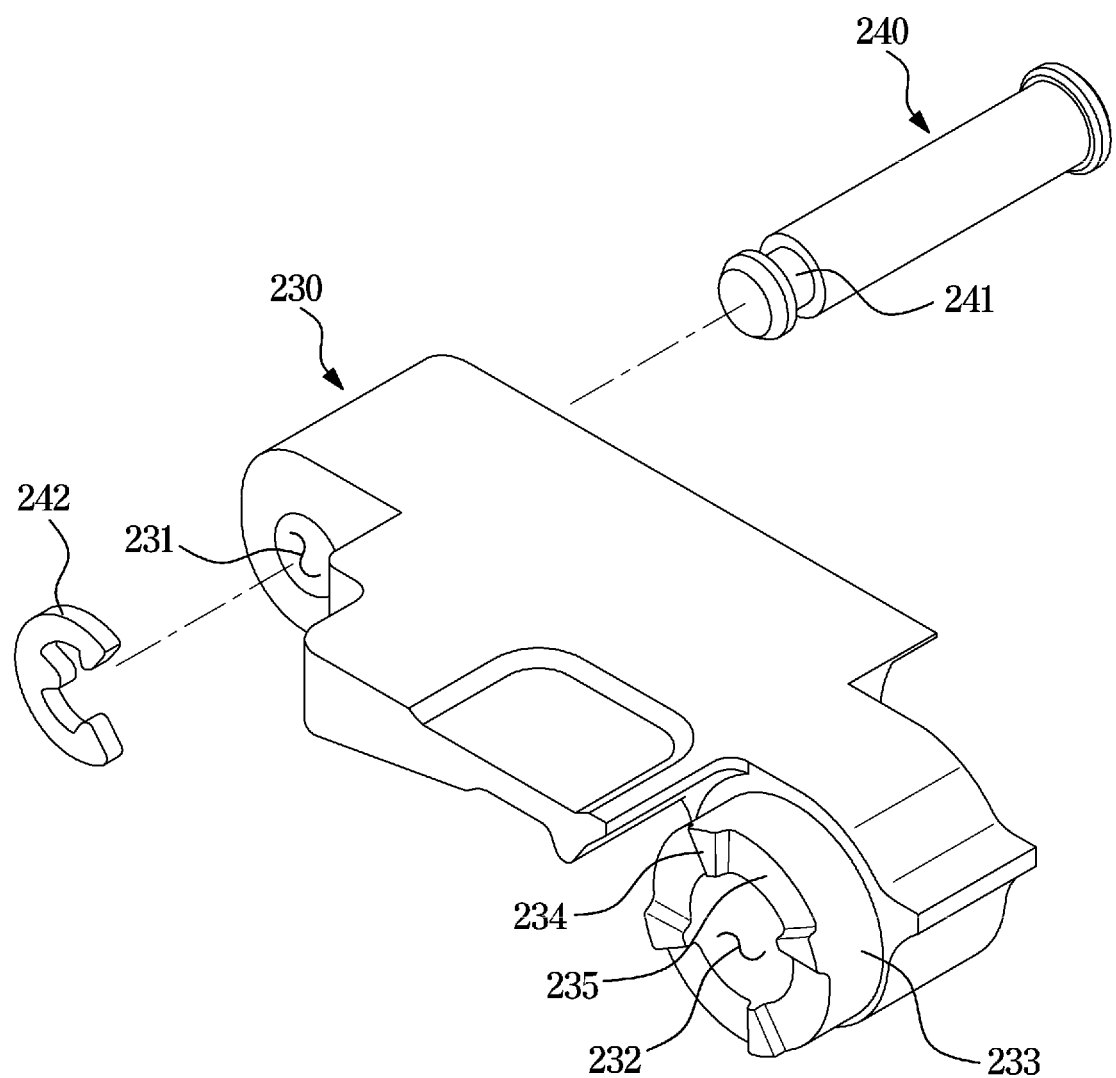
FIG. 9 is a view separately illustrating a wing member and a transmission shaft from a hinge module according to an embodiment of the disclosure.

FIG. 9 is a view separately illustrating a wing member and a transmission shaft from a hinge module according to an embodiment of the disclosure.

Figure 10:
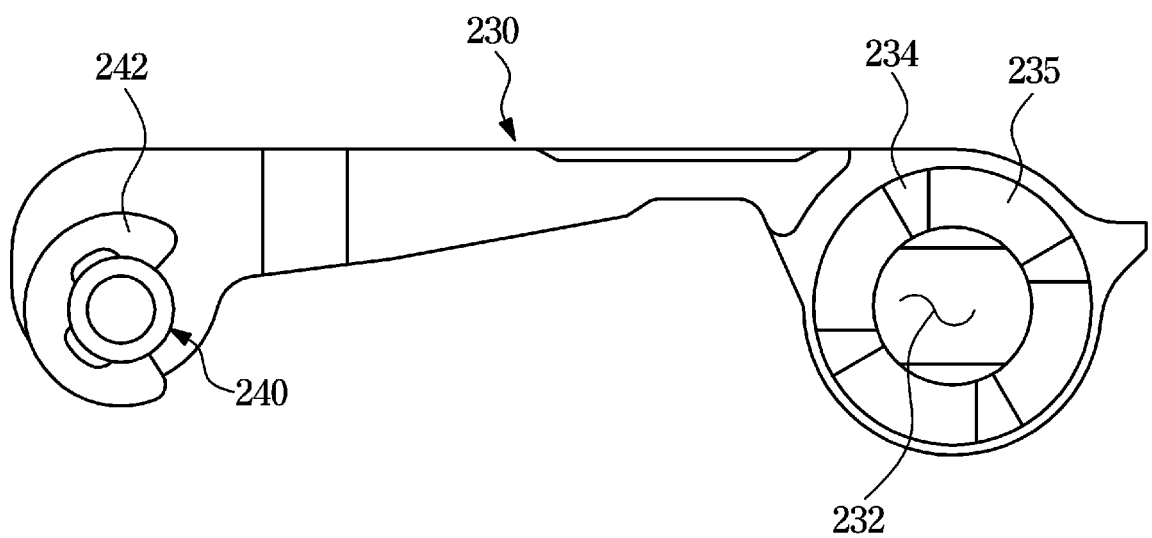
FIG. 10 is a view illustrating a wing member and a transmission shaft when viewed from a different angle according to an embodiment of the disclosure.

FIG. 10 is a view illustrating a wing member and a transmission shaft when viewed from a different angle according to an embodiment of the disclosure.

Referring to FIGS. 9 and 10, according to an embodiment of the disclosure, the wing member 230 includes a second shaft hole 232 through which the shaft gear 250 passes and a first transmission shaft hole 231 through which the transmission shaft 240 passes. Unlike the shaft gear 250, the transmission shaft 240 may have a circular cross-section so as to be rotatable relative to the first transmission shaft hole 231.

The transmission shaft 240 may be provided at one end thereof with an E-ring groove 241 into which the E-ring 242 may be fitted.

The wing member 230 may include a guiding gear 233 corresponding to the fixed gear 214 of the fixed bracket 210. The guiding gear 233 may be provided with the same structure as that of the fixed gear 214. Similar to the fixed gear 214, the guiding gear 233 may include a flat surface 235 and a guiding protrusion 234 formed to protrude from the flat surface 235 in the axial direction of the shaft gear 250. The guiding protrusion 234 may be provided in plural. According to an embodiment of the disclosure, the guiding gear 233 may include four guiding protrusions 234.

Figure 11:
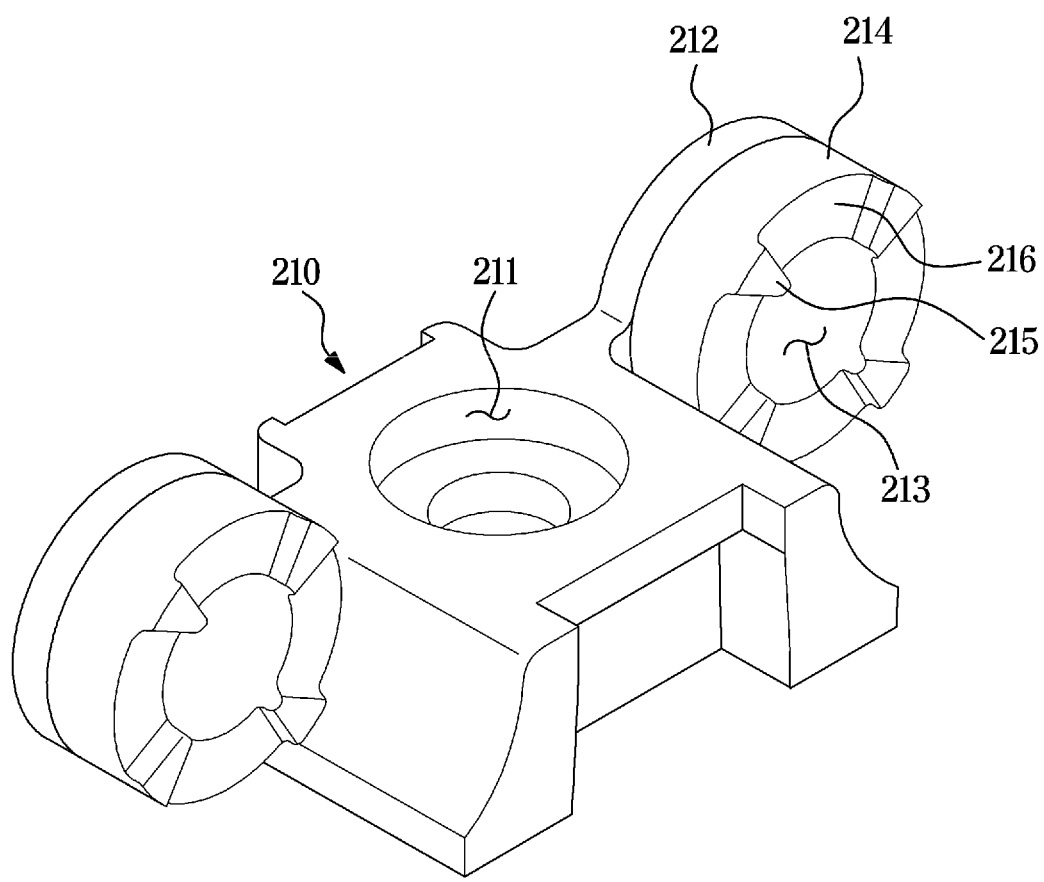
FIG. 11 is a view separately illustrating a fixed bracket from a hinge module according to an embodiment of the disclosure.

FIG. 11 is a view separately illustrating a fixed bracket from a hinge module according to an embodiment of the disclosure.

Figure 12:
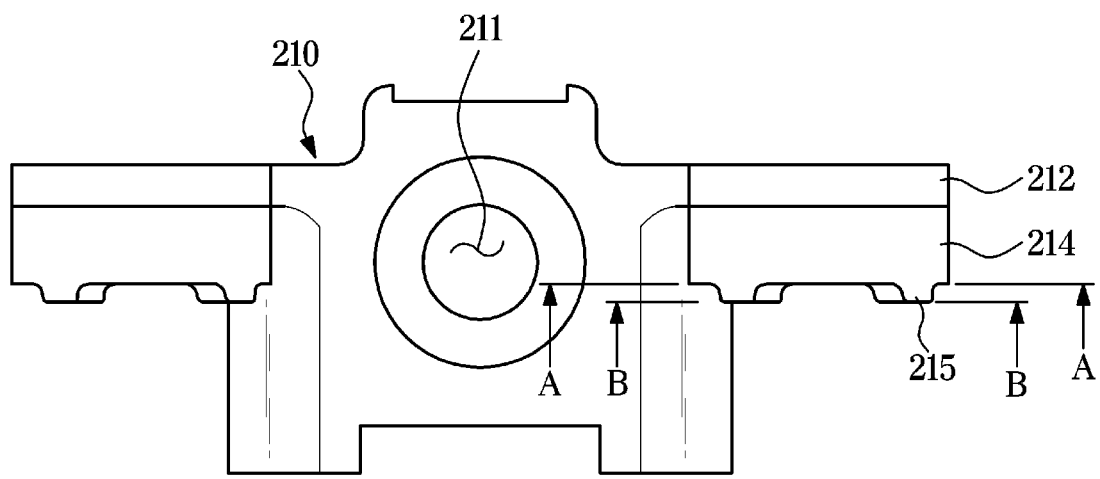
FIG. 12 is a view illustrating a fixed bracket when viewed from a different angle according to an embodiment of the disclosure.

FIG. 12 is a view illustrating a fixed bracket when viewed from a different angle according to an embodiment of the disclosure.

Figure 13:
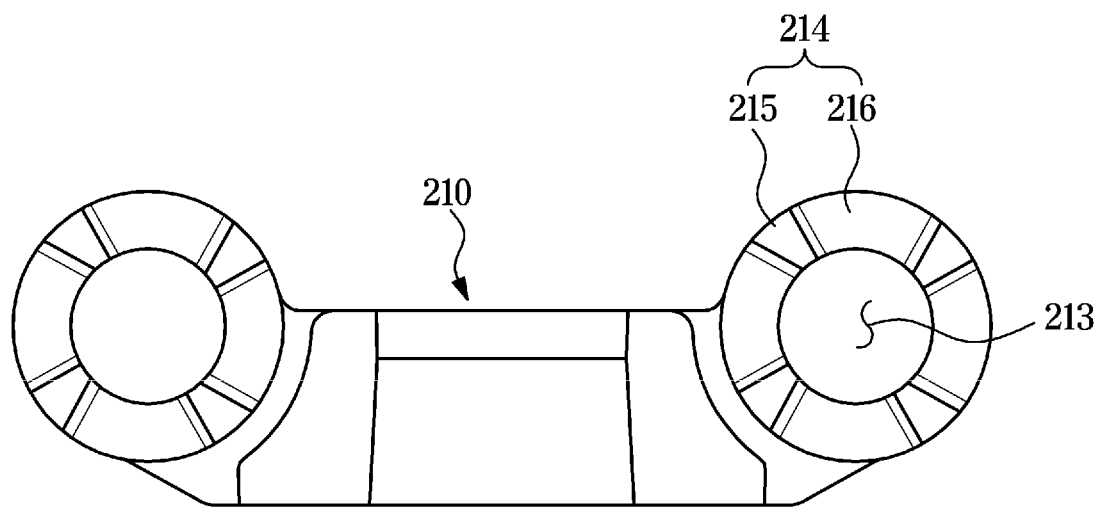
FIG. 13 is a view illustrating a fixed bracket when viewed from a different angle according to an embodiment of the disclosure.

FIG. 13 is a view illustrating a fixed bracket when viewed from a different angle according to an embodiment of the disclosure.

Referring to FIG. 11, as described above, the fixed bracket 210 may include the fixing hole 211, the shaft support portion 212, and the fixed gear 214. The fixed gear 214 may include the flat surface 216 and the fixing protrusion 215.

Referring to FIGS. 12 and 13, the fixing protrusion 215 may be provided such that an area thereof decreases as being protruded from the flat surface 216. The detailed structure of the fixing protrusion 215 will be described below.

Figure 14:
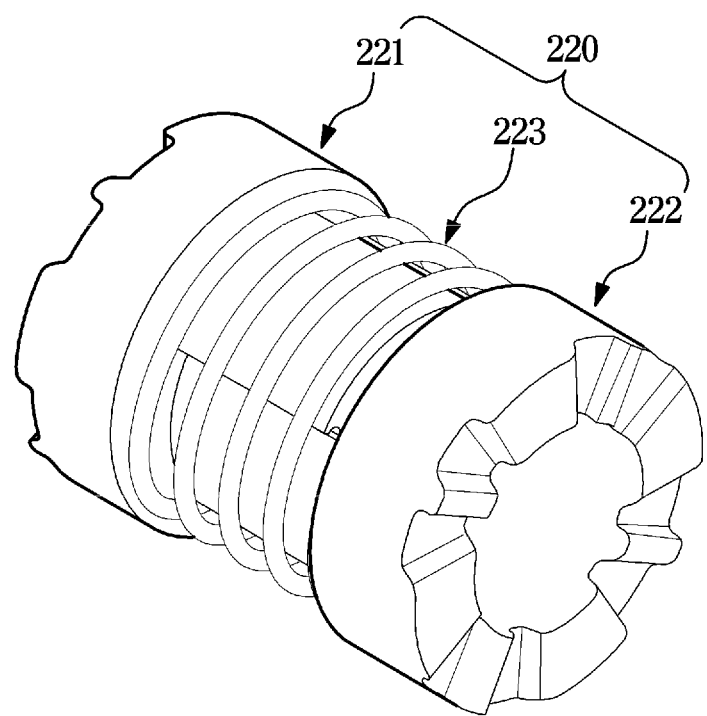
FIG. 14 is a view separately illustrating a rotary gear unit from a hinge module according to an embodiment of the disclosure.

FIG. 14 is a view separately illustrating a rotary gear unit from a hinge module according to an embodiment of the disclosure.

Figure 15:
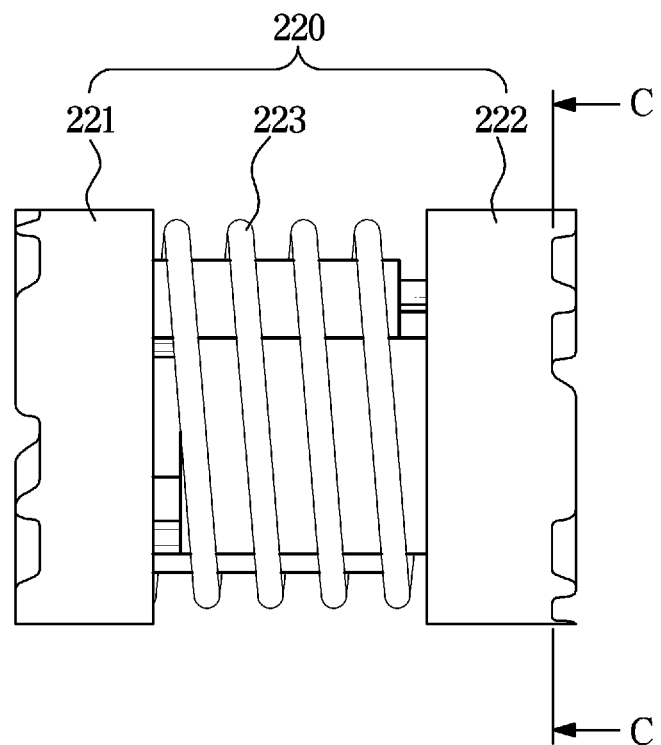
FIG. 15 is a view illustrating a rotary gear unit when viewed from a different angle according to an embodiment of the disclosure.

FIG. 15 is a view illustrating a rotary gear unit when viewed from a different angle according to an embodiment of the disclosure.

Figure 16:
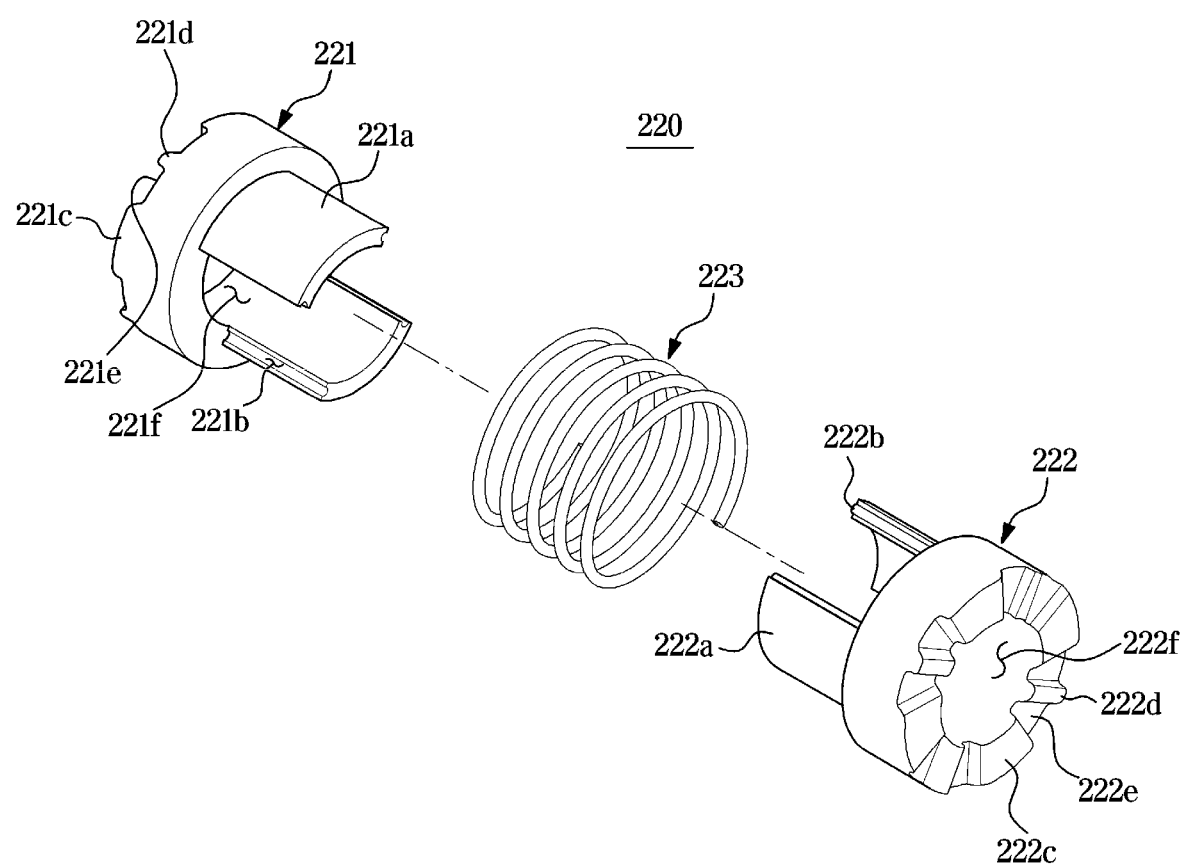
FIG. 16 is an exploded view illustrating a rotary gear unit according to an embodiment of the disclosure.

FIG. 16 is an exploded view illustrating a rotary gear unit according to an embodiment of the disclosure.

Referring to FIGS. 14 to 16, the rotary gear unit 220 may include a first rotary gear 221, a second rotary gear 222, and an elastic member 223.

The first rotary gear 221 may be provided to be engaged with the fixed gear 214. The first rotary gear 221 may be provided in a cylindrical shape, and include a gear body including a third shaft hole 221f through which the shaft gear 250 passes, a flat surface 221e provided on one surface of the gear body arranged to face the fixed gear 214, and first and second protrusions 221c and 221d protruding from the flat surface 221e in the axial direction of the shaft gear 250. In addition, the first rotary gear 221 may include a first coupling portion 221a protruding from the other surface of the gear body in the axial direction of the shaft gear 250.

The first coupling portion 221a may have an arc-shaped cross-section, and may be provided in plural. For example, the first coupling portion 221a may be provided in a pair. The shaft gear 250 may be inserted into an inside of the first coupling portions 221a.

The first coupling portion 221a may include a guide groove 221b. The guide groove 221b may extend along the axial direction of the shaft gear 250 together with the first coupling portion 221a. The guide groove 221b may be provided in a shape corresponding to that of a guide protrusion 222b which will be described below.

The first protrusion 221c and the second protrusion 221d of the first rotary gear 221 may each be provided in plural, and may be arranged to be spaced apart from each other in the circumferential direction of the first rotary gear 221. The first protrusion 221c may be provided to be larger than the second protrusion 221d, and the fixing protrusion 215 of the fixed gear 214 may be inserted between the first protrusion 221c and the second protrusion 221d. In other words, the fixing protrusion 215 may be fitted into the space between the first protrusion 221c and the second protrusion 221d. The shape of the flat surface 221e of the first rotary gear 221 may be provided to correspond to the shape of the upper surface of the fixing protrusion 215.

The second rotary gear 222 may have substantially the same structure as that of the first rotary gear 221. A second coupling portion 222a may be coupled to the first coupling portion 221a in the axial direction to form a circular cross-section together with the first coupling portion 221a. According to an embodiment of the disclosure, when the first rotary gear 221 and the second rotary gear 222 are coupled to each other in the axial direction, the pair of second coupling portions 222a may be arranged between the pair of first coupling portions 221a, and the first coupling portions 221a and the second coupling portions 222a may form a circular cross-section into which the shaft gear 250 is inserted.

However, the second coupling portion 222a of the second rotary gear 222 may include the guide protrusion 222b corresponding to the guide groove 221b. Except for the guide protrusion 222b, the second rotary gear 222 may have the same structure as that of the first rotary gear 221. The second rotary gear 222 may include a gear body provided in a cylinder shape including a fourth shaft hole 222f into which the shaft gear 250 is inserted, a flat surface 222e provided on one surface of the gear body, a third protrusion 222c, and a fourth protrusion 222d, and may include the second coupling portion 222a provided on the other surface of the gear body and a guide protrusion 222b provided on the second coupling portion 222a. As described above, except for the guide protrusion 222b, the second rotary gear 222 and the first rotary gear 221 may be provided to have the same structure. However, the first protrusion 221c and the second protrusion 221d may have an arrangement reverse to that of the third protrusion 222c and the fourth protrusion 222d. This will be described below.

According to an aspect of the disclosure, the elastic member 223 may be provided between the first rotary gear 221 and the second rotary gear 222. The elastic member 223 may provide an elastic force to the first rotary gear 221 and the second rotary gear 222 such that the first rotary gear 221 and the second rotary gear 222 move away from each other.

For example, the elastic member 223 may include a compression spring. The shaft gear 250 may be inserted inside the elastic member 223.

As the first rotary gear 221 includes the guide groove 221b and the second rotary gear 222 includes the guide protrusion 221b, the first rotary gear 221 and the second rotary gear 222 may be coupled to enable relative movement along the axial direction of the shaft gear 250. With such a configuration, the first rotary gear 221 or the second rotary gear 222 may move in the axial direction depending on the rotation direction of the first housing 2 or the second housing 3, as will be described below.

Figure 17:
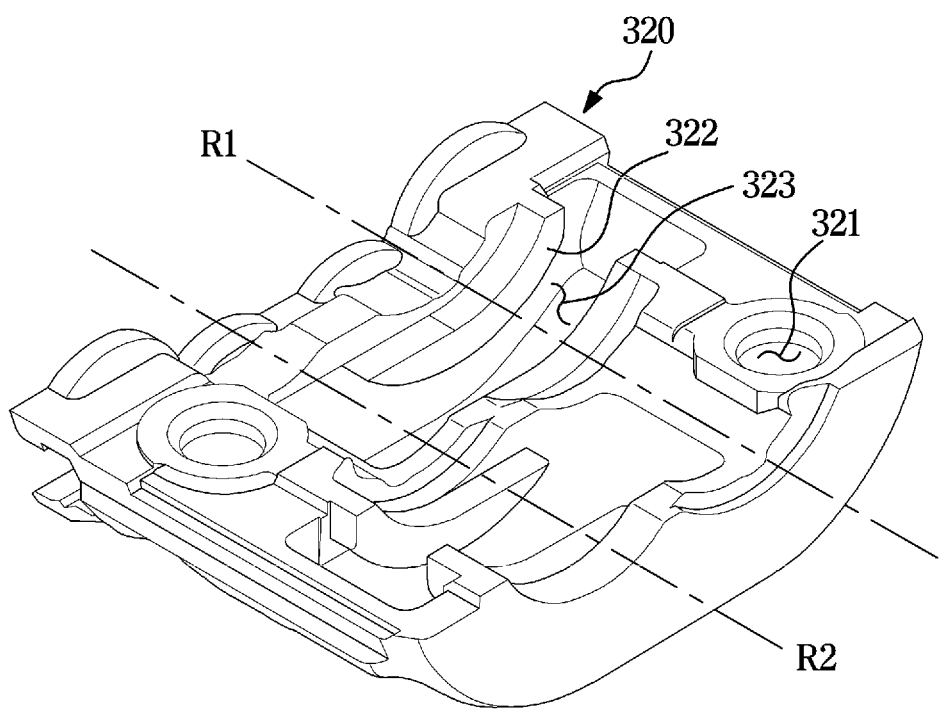
FIG. 17 is a view separately illustrating a rotation bracket from a hinge module according to an embodiment of the disclosure.

FIG. 17 is a view separately illustrating a rotation bracket from a hinge module according to an embodiment of the disclosure.

Referring to FIG. 17, the rotation bracket 320 may include a coupling hole 321 provided to fix the rotation bracket 320 to the cover member 110, a rotation guide portion for guiding the rotation of the rotating member 310, and a seating portion 323 on which the rotating member 310 is seated.

The coupling hole 321 may be provided to correspond to one of a plurality of fastening holes provided in the cover member 110. A fastening member (not shown) passes through the coupling hole 321 to be fastened to the fastening hole of the cover member 110, so that the rotation bracket 320 may be fixed to the cover member 110. According to an embodiment of the disclosure, the coupling hole 321 may be provided in a pair. The pair of coupling holes 321 may be arranged in a diagonal direction.

The rotation guide portion 322 may be provided to be inserted into the guide groove 313 of the rotating member 310, which will be described below, to guide the rotation of the rotating member 310. The rotation guide portion 322 may be provided in a pair such that the rotating member 310 may rotate stably. The rotation guide portion 322 may be provided to protrude in a direction parallel to rotation axes R1 and R2 of the shaft gear 250. In addition, the rotation guide portion 322 may be provided in an arc shape. The rotation guide portion 322 may have a width smaller than that of the guide groove 313 so as to be inserted into the guide groove 313. The shape of the rotation guide portion 322 may be provided to correspond to the shape of the guide groove 313.

At least a portion of the rotating member 310 may be arranged on the seating portion 323. According to an embodiment of the disclosure, the seating portion 323 may be provided such that the lower surface thereof is opened. An arc-shaped protrusion (not shown) provided on the cover member 110 may be inserted into the open lower surface. However, the disclosure is not limited thereto, and an arc-shaped protrusion for guiding the lower surface of the rotating member 310 may be provided on the seating portion rather than on the cover member.

Referring to FIG. 17, the rotation axes R1 and R2 of the shaft gear 250 may include a first rotation axis R1 and a second rotation axis R2. The first rotation axis R1 and the second rotation axis R2 may be spaced apart from each other by a predetermined distance in a direction perpendicular to the first rotation axis R1 or the second rotation axis R2. When the separation distance between the first rotation axis R1 and the second rotation axis R2 is significantly small, the flexible display panel 6 may be bent beyond the bending limit, and thus may be damaged. When the separation distance between the first rotation axis R1 and the second rotation axis R2 is significantly large, the foldable electronic device 1 may not be folded. Accordingly, the separation distance between the first rotation axis R1 and the second rotation axis R2 needs to be appropriately set.

Figure 18:
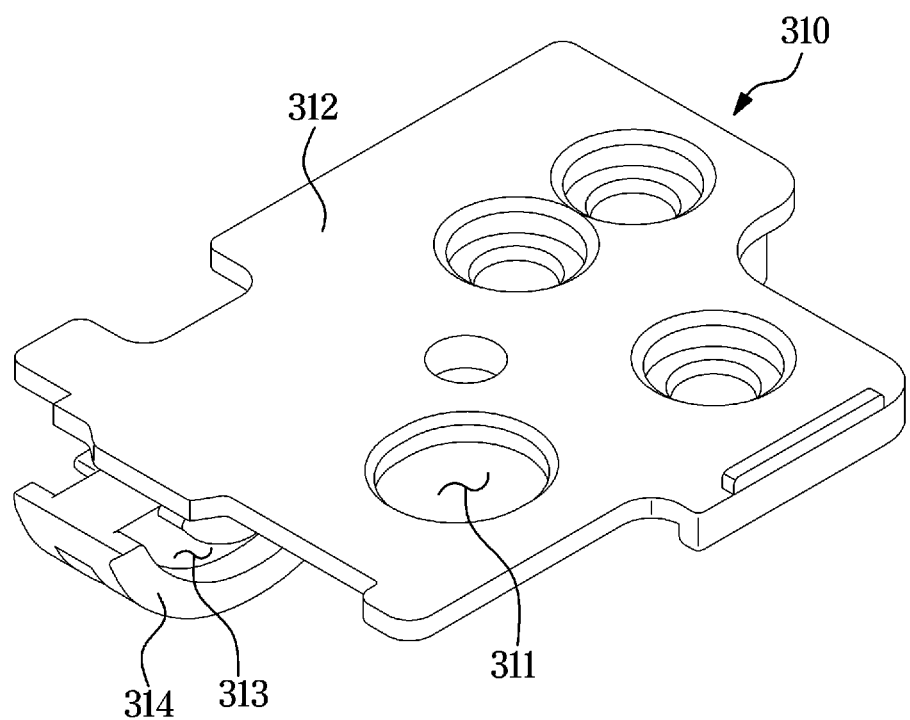
FIG. 18 is a view separately illustrating a rotating member from a hinge module according to an embodiment of the disclosure.

FIG. 18 is a view separately illustrating a rotating member from a hinge module according to an embodiment of the disclosure.

Figure 19:
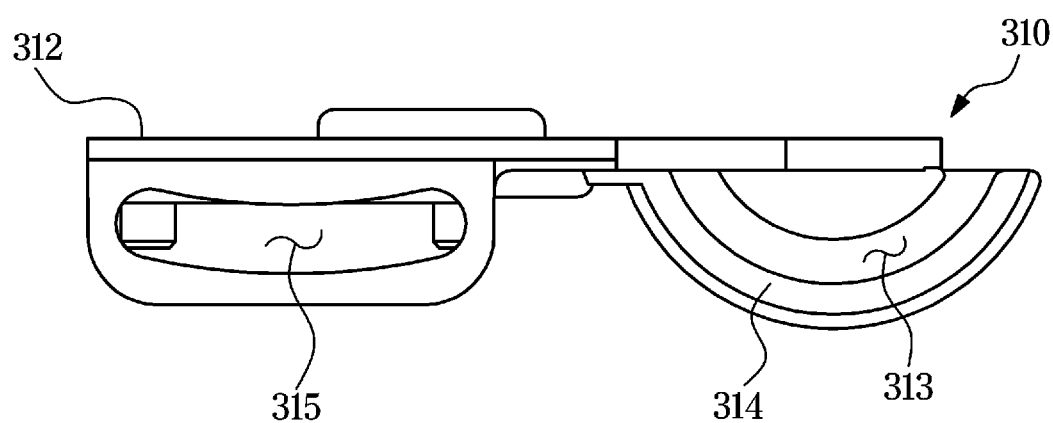
FIG. 19 is a view illustrating a rotating member when viewed from a different angle according to an embodiment of the disclosure.

FIG. 19 is a view illustrating a rotating member when viewed from a different angle according to an embodiment of the disclosure.

The rotating member 310 may be connected to the first housing 2 or the second housing 3 and may be provided to rotate together with the first housing 2 or the second housing 3.

Referring to FIG. 18, the rotating member 310 may include a rotating plate 312 forming a part of the front surface of the first housing 2 or the second housing 3, a plurality of fastening holes (not shown) passing through the rotating plates 312, a through hole 311. A fastening member (not shown) may be inserted into the through hole 311. The inner diameter of the through hole 311 may be larger than the outer diameter of the fastening member, for example, a screw. While the inner diameter of the coupling hole 321 of the rotation bracket 320 may be smaller than the outer diameter of the fastening member, the inner diameter of the through hole 311 of the rotating member 310 may be larger than the outer diameter of the fastening member. This is because the rotation bracket 320 needs to be fixed to the cover member 110 by a fastening member, and rotation of the rotating member 310 needs to be prevented from being restricted by the fastening member.

The rotating member 310 may include a guide groove 313 into which the rotation guide portion 322 of the rotation bracket 320 is slidably inserted, and a rotation support portion 314 forming a lower surface of the guide groove 313 and inserted into the seating portion 323 of the rotation bracket 320.

Referring to FIG. 19, the guide groove 313 may be provided in a shape corresponding to the rotation guide portion 322. The guide groove 313 may be provided in an arc shape. The guide groove 313 may include an upper surface and a lower surface with reference to FIG. 19, and the upper and lower surfaces may each have a diameter. The diameter of the upper surface of the guide groove 313 may be smaller than the diameter of the upper surface of the rotation guide portion 322 (see FIG. 17). The diameter of the lower surface of the guide groove 313 may be larger than the diameter of the lower surface of the rotation guide portion 322 (see FIG. 17). With such a configuration, the rotation guide portion 322 may be inserted into the guide groove 313 to slide.

Referring to FIG. 19, the rotating member 310 may include a second transmission shaft hole 315 into which the transmission shaft 240 is inserted. The second transmission shaft hole 315 may extend in a horizontal direction such that the transmission shaft 240 may move in an approximately horizontal direction with reference to FIG. 19. The shape of the second transmission shaft hole 315 may be provided in an arc shape similar to the guide groove 313, but may be provided to have a curvature smaller than that of the guide groove 313.

As the transmission shaft 240 is inserted into the first transmission shaft hole 231 and the second transmission shaft hole 315, the wing member 230 and the rotating member 310 may be connected to each other. Because the wing member 230 and the rotating member 310 are connected to each other, the wing member 230 and the rotating member 310 may rotate together.

The second transmission shaft hole 315 may define the rotation range of the wing member 230. The movement range of the transmission shaft 240 is limited to both ends of the second transmission shaft hole 315, so that the rotation range of the wing member 230 may be limited. For example, when the transmission shaft 240 is located at one end of the second transmission shaft hole 315, the first housing 2 or the second housing 3 may be located in a folded position, and when the transmission shaft 240 is located at the other end of the second transmission shaft hole 315, the first housing 2 or the second housing 3 may be located in an unfolded position.

Figure 20:
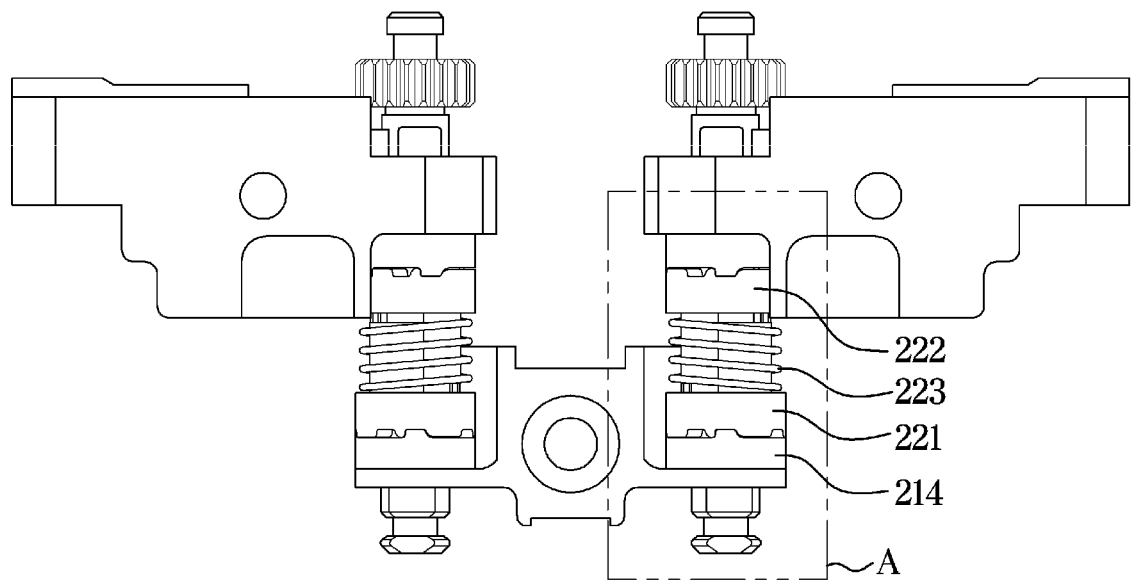
FIG. 20 is a view illustrating a hinge module according to an embodiment of the disclosure.

FIG. 20 is a view illustrating a hinge module according to an embodiment of the disclosure.

Figure 21:
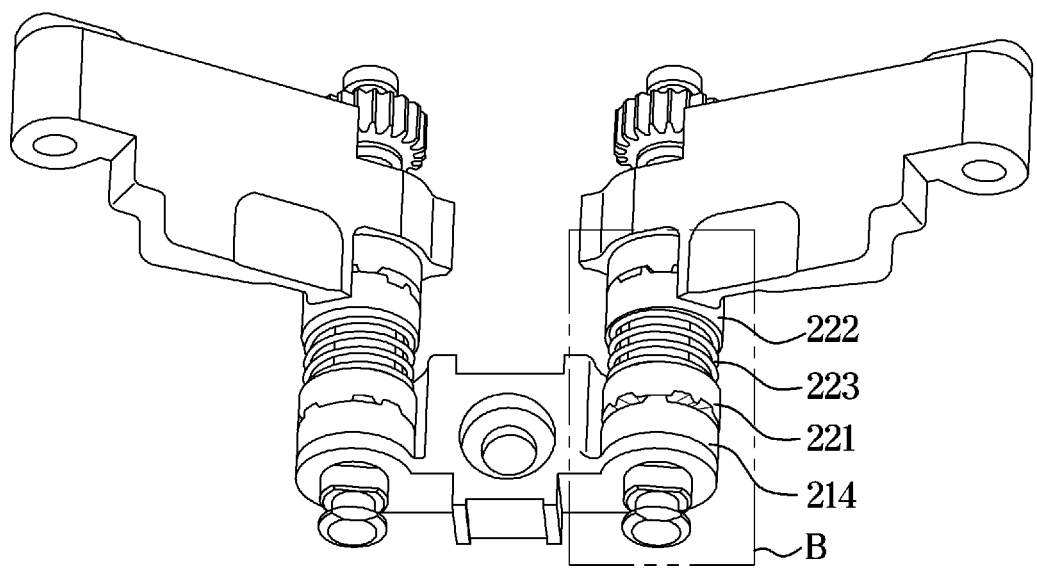
FIG. 21 is a view illustrating a state in which a shaft gear is rotated, in a hinge module according to an embodiment of the disclosure.

FIG. 21 is a view illustrating a state in which a shaft gear is rotated in a hinge module according to an embodiment of the disclosure.

Referring FIGS. 20 and 21, when the first housing 2 and the second housing 3 rotate, the rotary gear unit 220 may be provided to be displaced from the fixed gear 214 or the guiding gear 233. Specifically, in a process of the first housing 2 and the second housing 3 being folded, the rotary gear unit 220 connected to the first housing 2 may be displaced from the guiding gear 233, and the rotary gear unit 220 connected to the second housing 3 may be displaced from the fixed gear 214. When the rotary gear unit 220 connected to the first housing 2 is displaced with one of the fixed gear 214 and the guiding gear 233, the rotary gear unit 220 connected to the second housing 3 may be provided to be displaced from the other one of the fixed gear 214 and the guiding gear 233.

Figure 22:
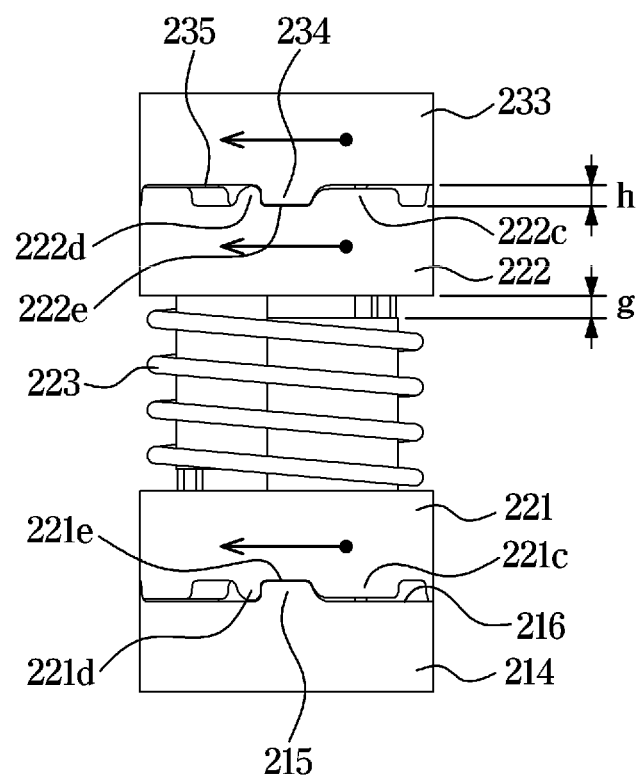
FIG. 22 is an enlarged view illustrating portion A of FIG. 20, which shows a state in which a fixed gear, a rotary gear unit, and a guiding gear are engaged with each other according to an embodiment of the disclosure.

FIG. 22 is an enlarged view illustrating portion A of FIG. 20, which shows a state in which a fixed gear, a rotary gear unit, and a guiding gear are engaged with each other according to an embodiment of the disclosure.

Figure 23:
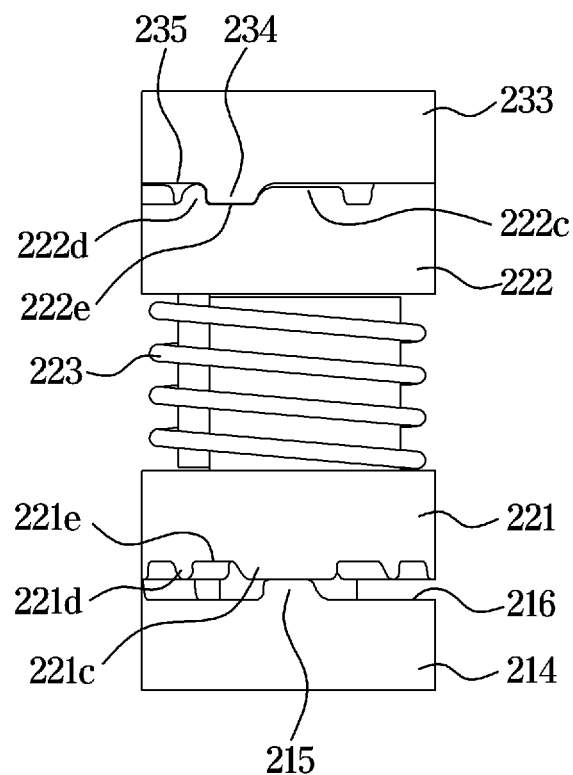
FIG. 23 is an enlarged view illustrating portion B of FIG. 21, which shows a state in which a shaft gear is rotated in a first direction according to an embodiment of the disclosure.

FIG. 23 is an enlarged view illustrating portion B of FIG. 21, which shows a state in which a shaft gear is rotated in a first direction according to an embodiment of the disclosure.

Figure 24:
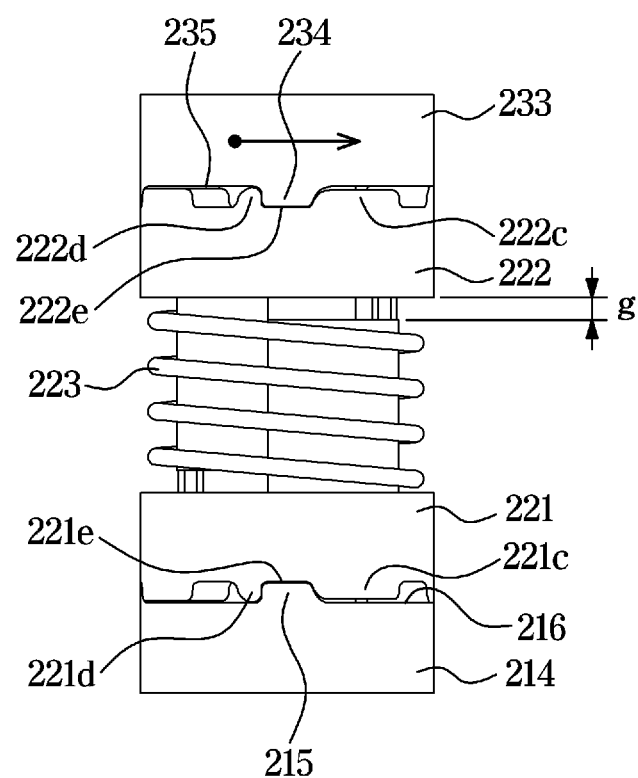
FIG. 24 is a view illustrating a state in which a fixed gear, a rotary gear unit, and a guiding gear are engaged with each other according to an embodiment of the disclosure.

FIG. 24 is a view illustrating a state in which a fixed gear, a rotary gear unit, and a guiding gear are engaged with each other according to an embodiment of the disclosure.

Figure 25:
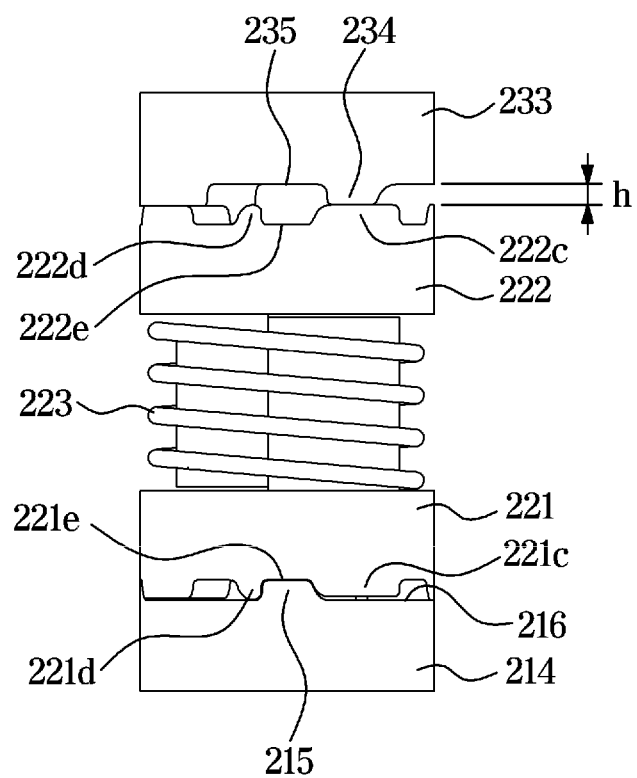
FIG. 25 is a view illustrating a state in which a shaft gear is rotated in a second direction from a state according to an embodiment of the disclosure.

FIG. 25 is a view illustrating a state in which a shaft gear is rotated in a second direction from a state according to an embodiment of the disclosure.

Hereinafter, the operation of the hinge module according to an embodiment of the disclosure will be described with reference to FIGS. 22 to 25.

According to an aspect of the disclosure, the hinge module 100 may allow the first housing 2 and the second housing 3 to be fixed at various positions between a folded position and an unfolded position. In other words, the first housing 1 and the second housing 2 may maintain an open state not only at a fully open angle (the unfolded state) and a fully folded angle (the folded state) but also at various opening angles therebetween. Accordingly, the user may use the foldable electronic device 1 at various opening angles, and the user convenience may be improved.

The hinge module 100 may include the fixed gear 214, the rotary gear unit 220, and the guiding gear 233 to maintain the first housing 2 and the second housing 3 in an open state at various opening angles.

Referring to FIGS. 20 and 22, when the first housing 2 and the second housing 3 are in the unfolded position, the fixed gear 214, the rotary gear unit 220, and the guiding gear 233 may be in an engaged state. Specifically, the fixed gear 214 and the first rotary gear 221 may remain engaged with each other, and the second rotary gear 222 and the guiding gear 233 may remain engaged with each other.

Referring to FIGS. 21 and 23, when the shaft gear 250 rotates in the first direction, the second rotary gear 222 remains engaged with the guiding gear 233 while the first rotary gear 221 may be displaced from the fixed gear 214. This is because the first rotary gear 221 is provided to perform relative rotation with respect to the fixed gear 214 in only one direction, and the second rotary gear 222 is provided to perform relative rotation with respect to the guiding gear 233 only in the other direction. Specifically, the first rotary gear 221 may be provided to perform relative rotation with respect to the fixed gear 214 in the first direction. The second rotary gear 222 may be provided to perform relative rotation with respect to the guiding gear 233 in the second direction.

Referring to FIGS. 21 and 23, because the rotary gear unit 220 rotates in the first direction, the first rotary gear 221 rotates relative to the fixed gear 214 to be displaced with the fixed gear 214, and the second rotary gear 222 may remain engaged with the guiding gear 233.

As described above, the rotary gear unit 220 may be provided to perform relative rotation in only one direction with respect to the fixed gear 214 and the guiding gear 233. To this end, an inclined surface provided at one end of the fixing protrusion 215 may have an inclination angle different from that of an inclined surface provided at the other end of the fixing protrusion 215. For example, the inclined surface provided at one end of the fixing protrusion 215 may be gentle, while the inclined surface provided at the other end of the fixing protrusion 215 may be approximately vertical. Similarly, an inclined surface provided at one end of the guiding protrusion 234 may have an inclination angle different from that of an inclined surface provided at the other end of the guiding protrusion 234. For example, the inclined surface provided at one end of the guiding protrusion 234 may be approximately vertical, while the inclined surface provided at the other end of the guiding protrusion 234 may be gentle. For example, the fixing protrusion 215 of the fixed gear 214 and the guiding protrusion 234 of the guiding gear 233 may have inclined surfaces in opposite directions to each other.

The first protrusion 221c and the second protrusion 222d of the first rotary gear 221 may be provided to correspond to the fixing protrusion 215 of the fixed gear 214, and the third protrusion 222c and the fourth protrusion 222d of the second rotary gear 222 may be provided to correspond to the guiding protrusion 234 of the guiding gear 233.

Referring to FIGS. 24 and 25, when the shaft gear 250 rotates in the second direction opposite to the first direction, the first rotary gear 221 remains engaged with the fixed gear 214, while the second rotary gear 222 may be displaced from the guiding gear 233. This is because the first rotary gear 221 is provided to perform relative rotation only in the first direction with respect to the fixed gear 214, and the second rotary gear 222 is provided to perform relative rotation only in the second direction with respect to the guiding gear 233.

Due to the unidirectional rotation structure described above and the elastic member 223 provided in the rotary gear unit 220, the hinge module 100 may allow the first housing 2 and the second housing 3 to be fixed at various opening angles.

In the specification, the height of the fixing protrusion 215 and the guiding protrusion 234 and the height of the first protrusion 221c to the fourth protrusion 222d represent the height of the fixed gear 214 and the guiding gear 233 and the height of the first rotary gear 221 and the second rotary gear 222, respectively.

Referring to FIGS. 22 to 25, the height h of the fixing protrusion 215 and the guiding protrusion 234 may be substantially equal to the gap g between the first coupling portion 221a and the second coupling portion 222a. Alternatively, the gap g between the first coupling portion 221a and the second coupling portion 222a may be provided to be larger than the height h of the fixing protrusion 215 or the guiding protrusion 234. However, the gap g between the first coupling portion 221a and the second coupling portion 222a may not be provided to be smaller than the height h of the fixing protrusion 215 or the guiding protrusion 234.

For example, the following relation is established between the gap g and the height h.

$$g \geq h$$

The elastic member 223 may elastically bias the first rotary gear 221 and the second rotary gear 222 such that the first rotary gear 221 and the second rotary gear 222 move away from each other. Due to the elastic force of the elastic member 223, the hinge module 100 may allow the first housing 2 and the second housing 3 to be fixed at various opening angles.

According to the aspect of the disclosure, even when the fixed gear 214 and the first rotary gear 221 are displaced from each other, the elastic force of the elastic member 223 may cause the fixed gear 214 and the first rotary gear 221 to remain fixed without performing relative rotation. Similarly, even when the guiding gear 233 and the second rotary gear 222 are displaced, the elastic force of the elastic member 223 may cause the guiding gear 233 and the second rotary gear 222 to remain fixed without performing relative rotation. When the user rotates the first housing 2 or the second housing 3 by applying a force greater than or equal to the elastic force of the elastic member 223, the fixed gear 214 and the first rotary gear 221 displaced from each other may rotate again, and similarly, the guiding gear 233 and the second rotary gear 222 displaced from each other may rotate again.

Figure 26:
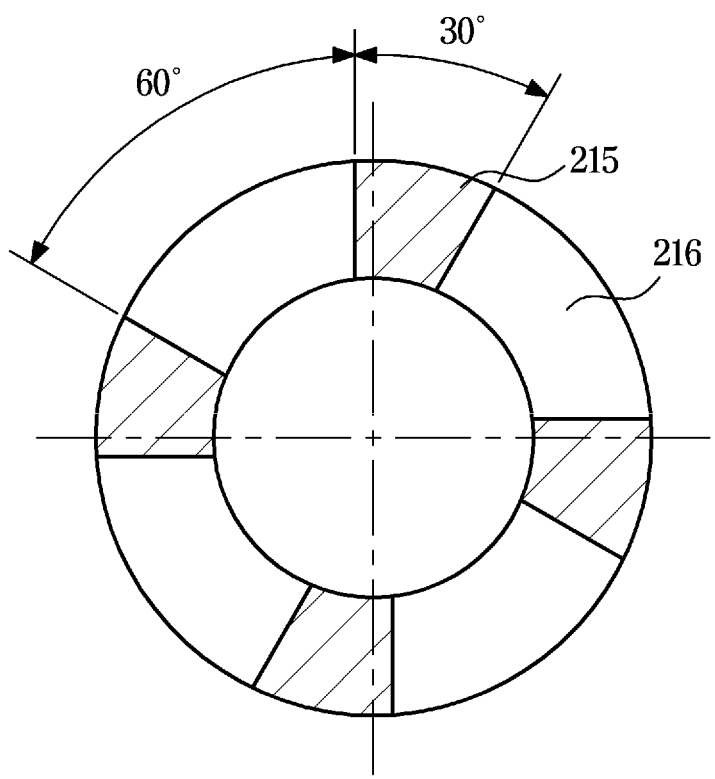
FIG. 26 is a cross-sectional view taken along line A-A of FIG. 12 according to an embodiment of the disclosure.

FIG. 26 is a cross-sectional view taken along line A-A of FIG. 12 according to an embodiment of the disclosure.

Figure 27:
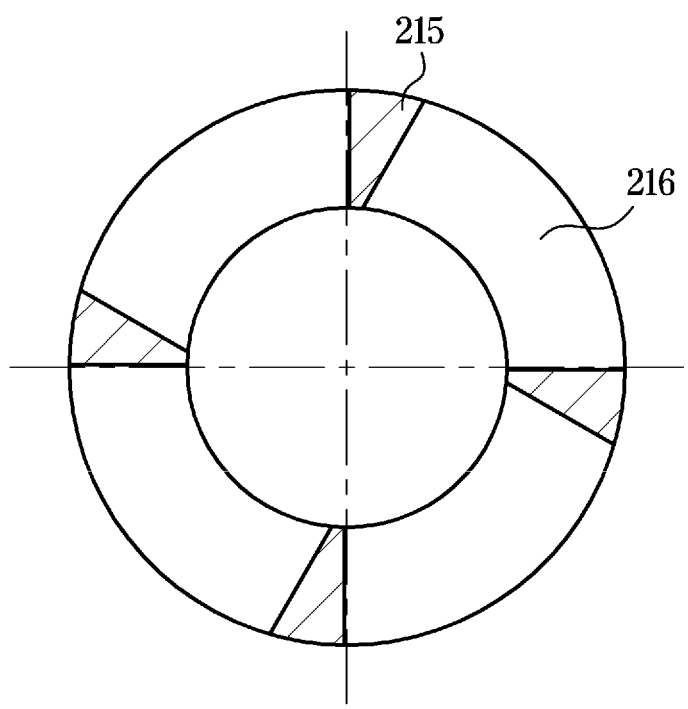
FIG. 27 is a cross-sectional view taken along line B-B of FIG. 12 according to an embodiment of the disclosure.

FIG. 27 is a cross-sectional view taken along line B-B of FIG. 12 according to an embodiment of the disclosure.

Figure 28:
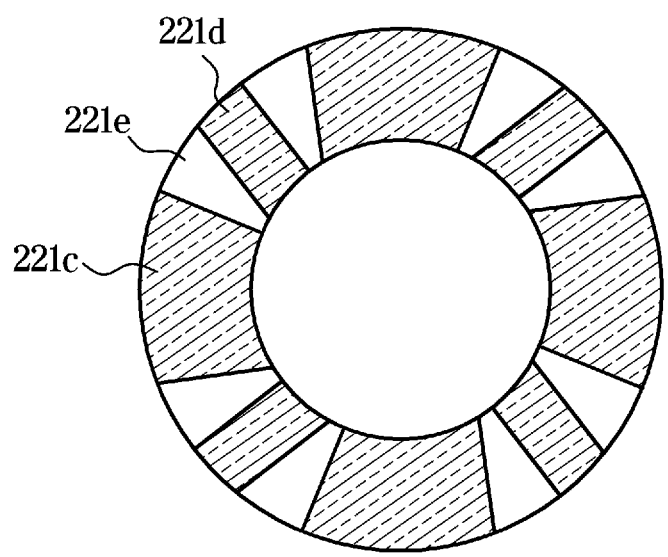
FIG. 28 is a cross-sectional view taken along line C-C of FIG. 15 according to an embodiment of the disclosure.

FIG. 28 is a cross-sectional view taken along line C-C of FIG. 15 according to an embodiment of the disclosure.

Figure 29:
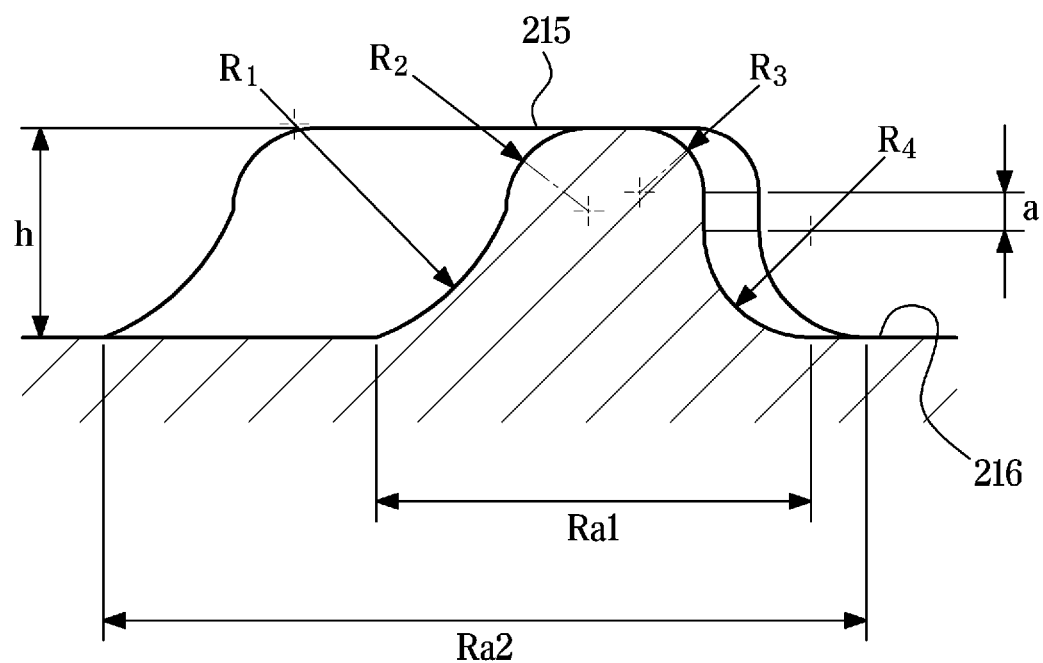
FIG. 29 is a view illustrating a part of a fixed gear when viewed from a different angle according to an embodiment of the disclosure.

FIG. 29 is a view illustrating a part of a fixed gear when viewed from a different angle according to an embodiment of the disclosure.

Figure 30:
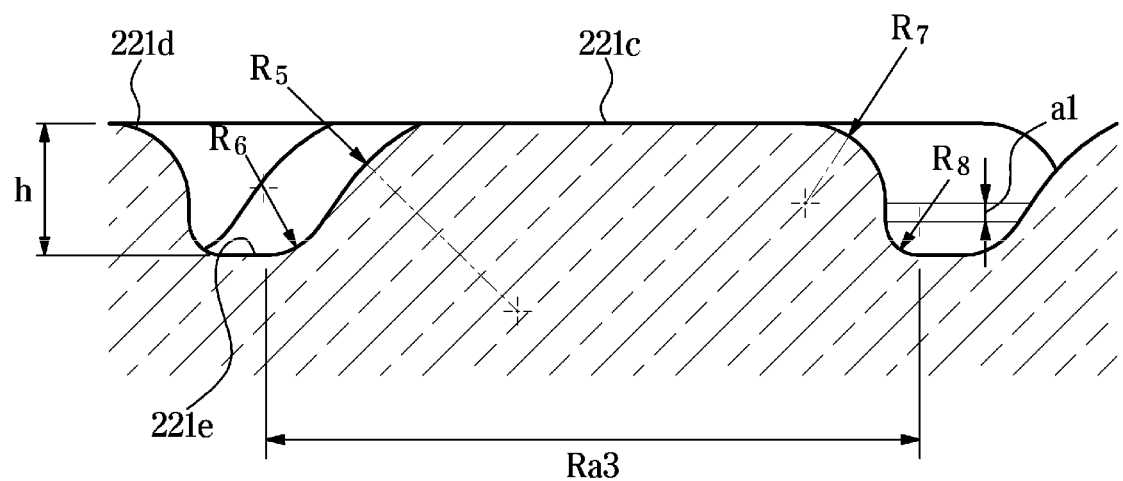
FIG. 30 is a view illustrating a portion of a rotary gear when viewed from a different angle according to an embodiment of the disclosure.

FIG. 30 is a view illustrating a portion of a rotary gear when viewed from a different angle according to an embodiment of the disclosure.

Figure 31:
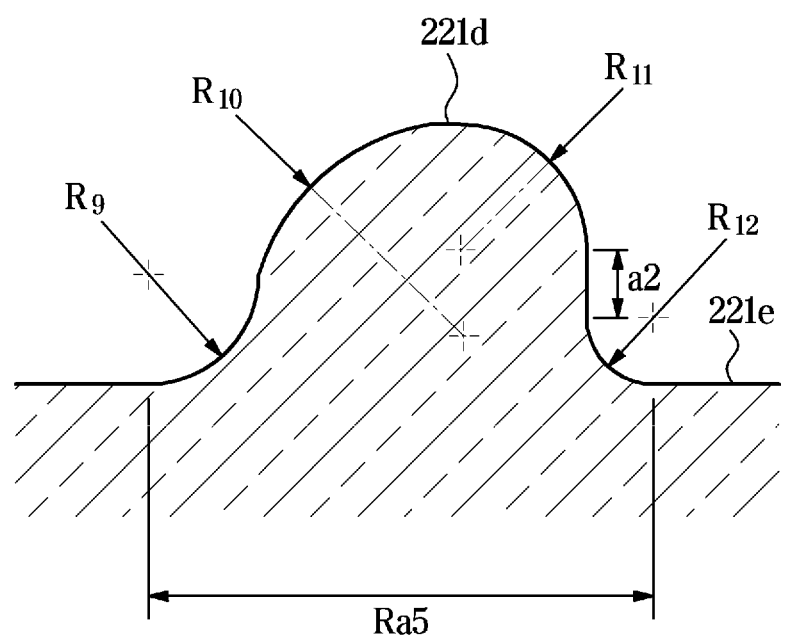
FIG. 31 is a view illustrating a second protrusion shown in FIG. 28 when viewed from a different angle according to an embodiment of the disclosure.

FIG. 31 is a view illustrating a second protrusion shown in FIG. 28 when viewed from a different angle according to an embodiment of the disclosure.

Figure 32:
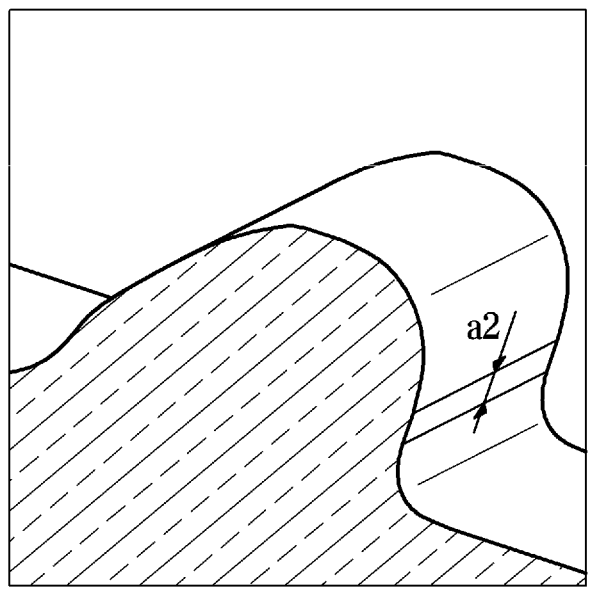
FIG. 32 is a view illustrating a second protrusion when viewed from a different angle according to an embodiment of the disclosure.

FIG. 32 is a view illustrating a second protrusion when viewed from a different angle according to an embodiment of the disclosure.

Referring to FIGS. 26 to 32, a detailed structure of the fixing protrusion 215, the guiding protrusion 234, and the first protrusion 221c to the fourth protrusion 222d according to the disclosure will be described.

Because the fixing protrusion 215 and the guiding protrusion 234 have the same structure except that the directions of the inclined surfaces are opposite to each other, only the fixing protrusion 215 will be described below. For the same reason, only the first protrusion 221c and the second protrusion 221d will be described.

Referring to FIG. 29, the length Ra1 of the inner peripheral surface of the fixing protrusion 215 and the length Ra2 of the outer peripheral surface of the fixing protrusion 215 may be obtained as follows.

$Ra1=c1/12$ ($c1$ is the circumferential length of the fifth shaft hole 215 of the fixed gear)

$Ra2=c2/12$ ($c2$ is the circumferential length of the outer peripheral surface of the fixed gear)

Referring to FIG. 29, h indicates the height of the fixing protrusion 215, and a indicates the height of a vertical surface provided on a steep slope of the fixing protrusion 215.

In addition, R1 to R4 represent radii of curvature in each section of the fixing protrusion 215.

According to an embodiment of the disclosure, the following relational expression is satisfied.

$R1>R2, R4>R3, R1+R2=h, R3+R4=h-a$

Referring to FIG. 30, Ra3 represents the length of the inner peripheral surface of the first protrusion 221c. H represents the height of the first protrusion 221c. a1 represents the height of a vertical surface provided on a steep inclined surface of the first protrusion 221c.

In addition, R5 to R8 represent radii of curvature in each section of the first protrusion 221c.

According to an embodiment of the disclosure, the following relational expression is satisfied.

$R5=R2, R6=R1, R7=R3, R8=R4, a1=a$

Referring to FIG. 31, Ra5 represents the length of the inner peripheral surface of the second protrusion 221d. R9 to R12 represent radii of curvature in each section of the second protrusion 221d. a2 represents the height of the vertical surface provided on the steep inclined surface of the second protrusion 221d. Although not shown in the drawings, Ra6 represents the length of the outer peripheral surface of the second protrusion 221d.

According to an embodiment of the disclosure, the following relational expression is satisfied.

$Ra5=Ra6=Ra3/3=R9+R10+R11+R12$ $R9=R6=R10=R5, R11=R7=R3, R12=R8=R4$ $a2=a1=a$

Figure 33:
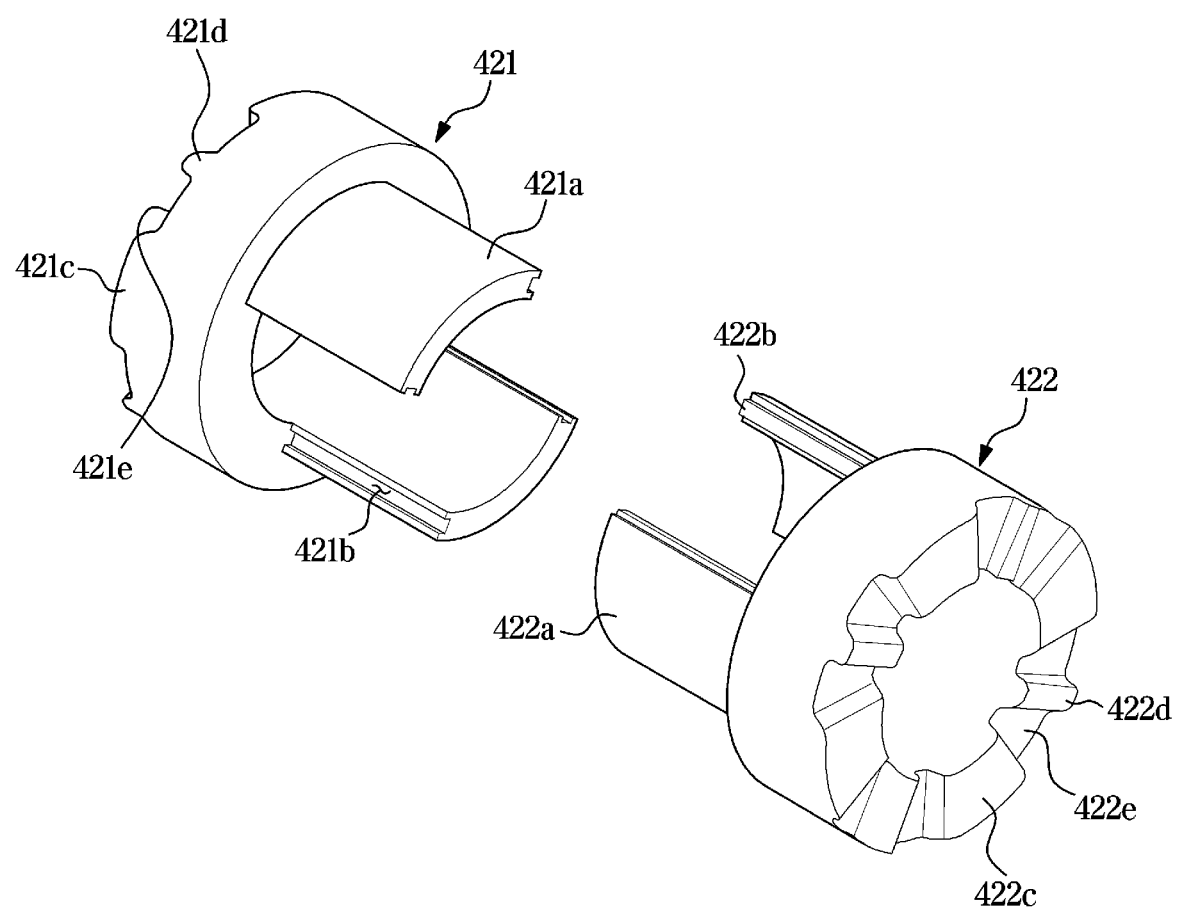
FIG. 33 is an exploded view illustrating a rotary gear unit, in a hinge module according to an embodiment of the disclosure.

FIG. 33 is an exploded view illustrating a rotary gear unit in a hinge module according to an embodiment of the disclosure.

Hereinafter, a rotary gear unit according to another embodiment of the disclosure will be described with reference to FIG. 33.

Referring to FIG. 33, according to the embodiment of the disclosure, the rotary gear unit may include a first rotary gear 421 and a second rotary gear 422.

The first rotary gear 421 may include a first coupling portion 421a, a guide groove 421b, a first protrusion 421c, a second protrusion 421d, and a flat surface 421e.

The second rotary gear 422 may include a second coupling portion 422a, a guide protrusion 422b, a third protrusion 422c, a fourth protrusion 422d, and a flat surface 422e.

In the embodiment of the disclosure, components except for the guide groove 421b and the guide protrusion 422b are the same as those described above, and thus the same description will be omitted.

According to the embodiment of the disclosure, the guide groove 421b and the guide protrusion 422b may each be provided with a rectangular cross-section. While the cross-section of the guide groove 221b and the guide protrusion 222b in the above embodiment is provided in a semicircular shape, the cross-sectional shape according to the embodiment may be provided in a rectangular shape.

Figure 34:
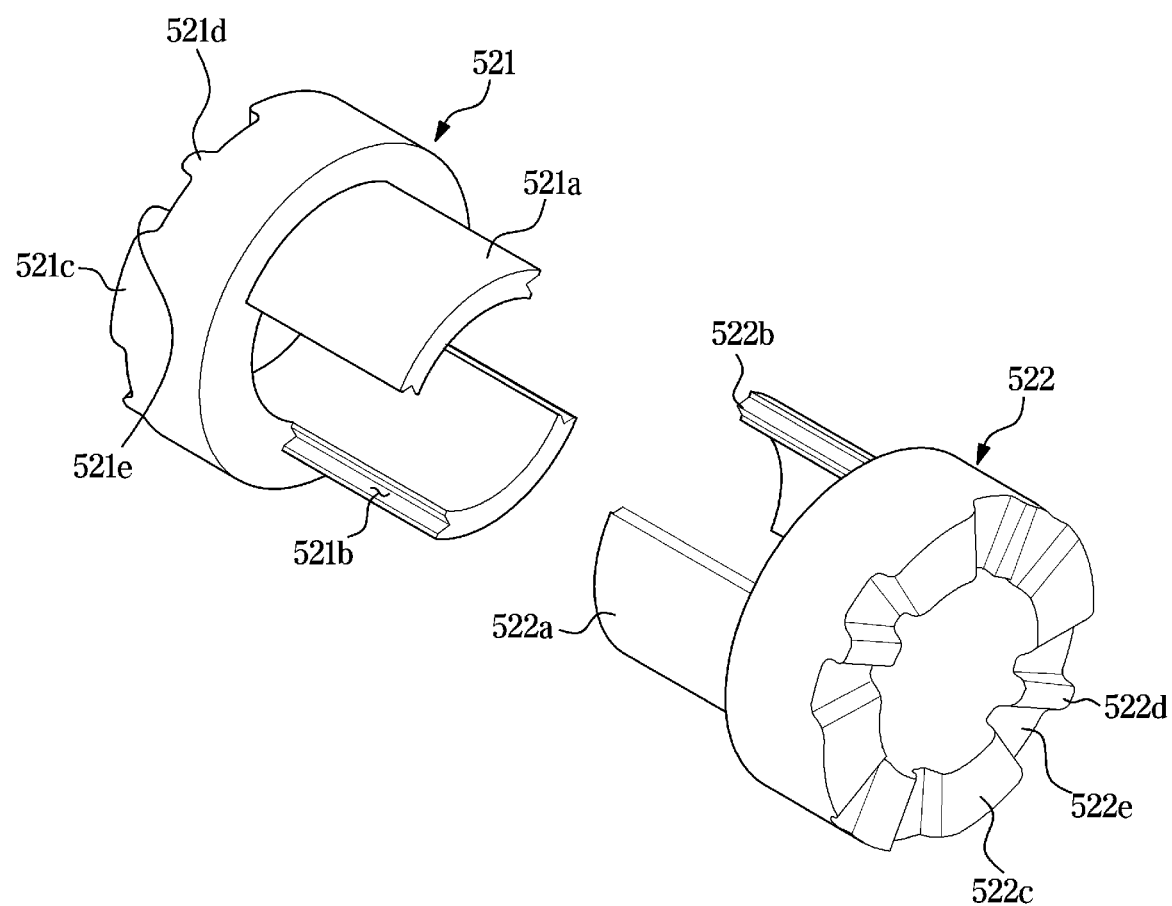
FIG. 34 is an exploded view illustrating a rotary gear unit, in a hinge module according to an embodiment of the disclosure.

FIG. 34 is an exploded view illustrating a rotary gear unit in a hinge module according to an embodiment of the disclosure.

Referring to FIG. 24, according to the embodiment of the disclosure, the rotary gear unit may include a first rotary gear 521 and a second rotary gear 522.

The first rotary gear 521 may include a first coupling portion 521a, a guide groove 521b, a first protrusion 521c, a second protrusion 521d, and a flat surface 521e.

The second rotary gear 522 may include a second coupling portion 522a, a guide protrusion 522b, a third protrusion 522c, a fourth protrusion 522d, and a flat surface 522e.

In the embodiment of the disclosure, components except for the guide groove 521b and the guide protrusion 522b are the same as those described above, and thus the same description will be omitted.

According to the embodiment of the disclosure, the guide groove 521b and the guide protrusion 522b may each be provided with a triangular cross-section.

Figure 35:
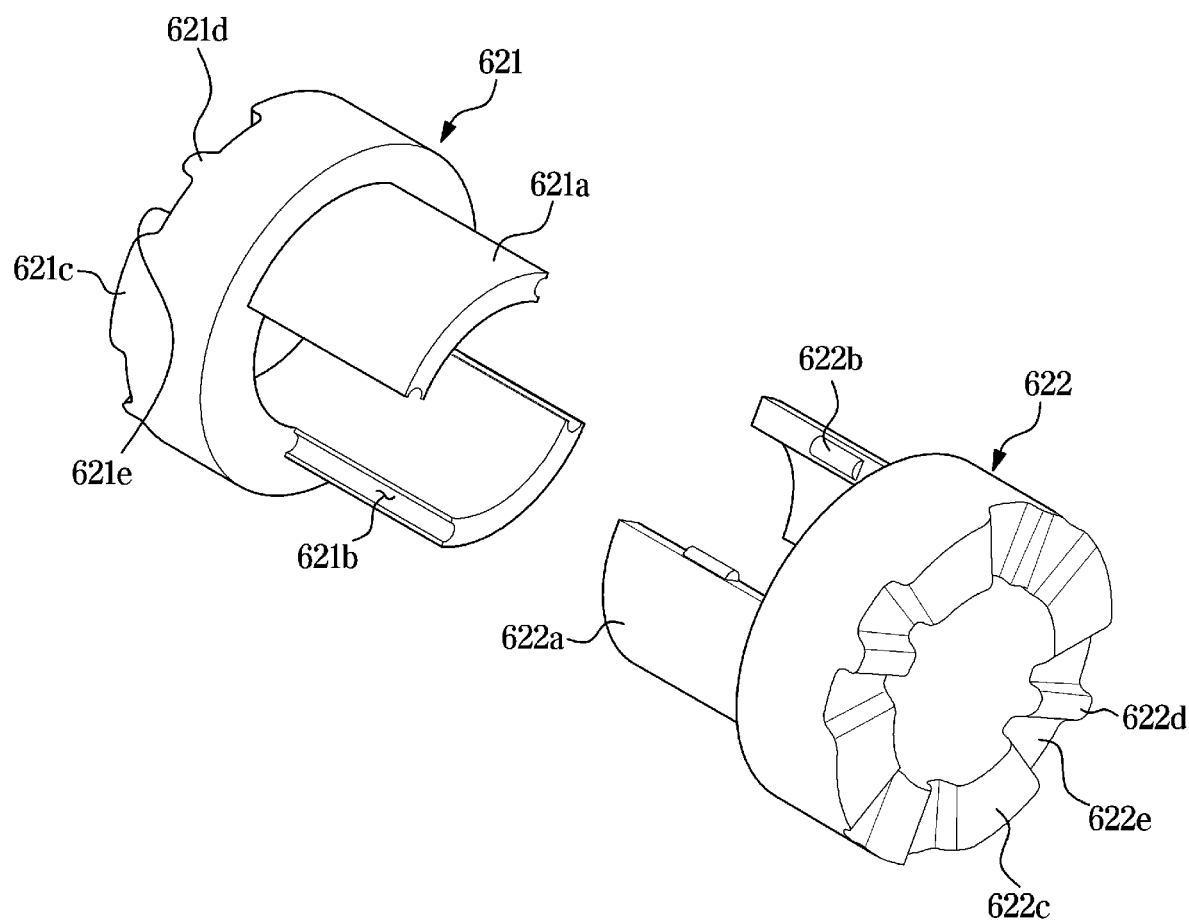
FIG. 35 is an exploded view illustrating a rotary gear unit, in a hinge module according to an embodiment of the disclosure.

FIG. 35 is an exploded view illustrating a rotary gear unit in a hinge module according to an embodiment of the disclosure.

Referring to FIG. 35, according to the embodiment of the disclosure, the rotary gear unit may include a first rotary gear 621 and a second rotary gear 622.

The first rotary gear 621 may include a first coupling portion 621a, a guide groove 621b, a first protrusion 621c, a second protrusion 621d, and a flat surface 621e.

The second rotary gear 622 may include a second coupling portion 622a, a guide protrusion 622b, a third protrusion 622c, a fourth protrusion 622d, and a flat surface 622e.

According to the embodiment of the disclosure, the guide protrusion 622b does not extend together with the second coupling portion 622a, but may be provided only in a part of the second coupling portion 622a. Specifically, the length in the axial direction of the guide protrusion 622b may be provided to be smaller than the length in the axial direction of the second coupling portion 622a.

Although the cross-sectional shapes of the guide protrusion 622b and the guide groove 621b are illustrated as being semicircular, the cross-sectional shape may be provided in various shapes, such as a rectangle, a square, and a triangle.

Figure 36:
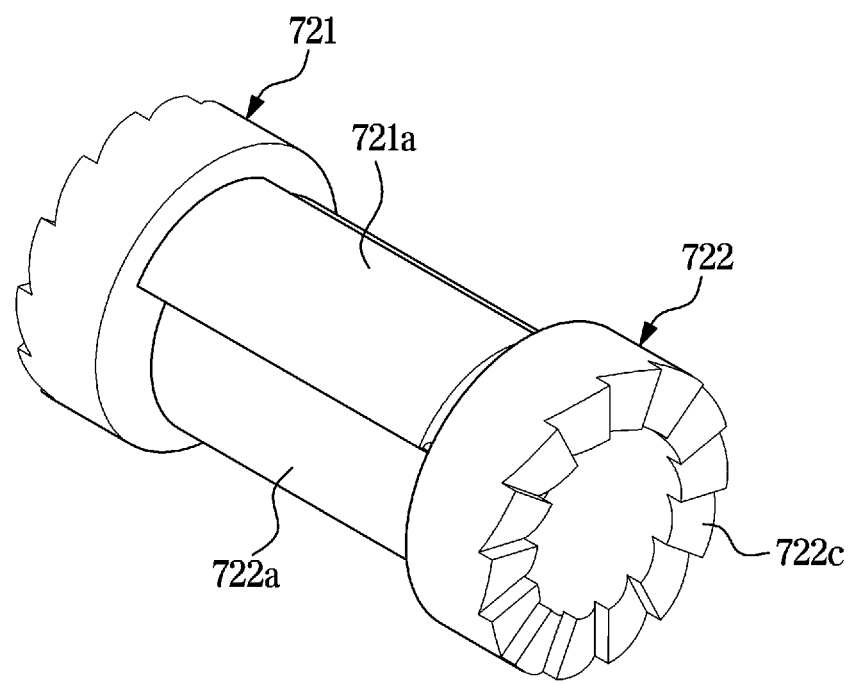
FIG. 36 is an exploded view illustrating a rotary gear unit, in a hinge module according to an embodiment of the disclosure.

FIG. 36 is an exploded view illustrating a rotary gear unit in a hinge module according to an embodiment of the disclosure.

Referring to FIG. 36, according to the embodiment of the disclosure, the rotary gear unit may include a first rotary gear 721 and a second rotary gear 722.

According to the embodiment of the disclosure, the first rotary gear 721 may not include a flat surface. In addition, protrusions 722c including a first inclined 721a surface provided in a substantially circular arc shape and a second inclined surface 721b provided substantially vertical may be continuously arranged along the circumferential direction of the first rotary gear 721.

The second rotary gear 722 may be provided with the same structure as the first rotary gear 721, but include protrusions 722c whose inclination is formed in the opposite direction to that of the first rotary gear 721.

According to an aspect of the disclosure, a hinge module and a foldable electronic device including the same can support a first housing and a second housing such that the first housing and the second housing maintain an open state at various angles.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A foldable electronic device comprising:
   a first housing;
   a second housing provided in a shape corresponding to a shape of the first housing; and
   a hinge module rotatably connecting the first housing to the second housing, the hinge module configured to fix the first housing and the second housing at a certain opening angle,
   wherein the hinge module includes:
      a fixed gear fixed without rotation and configured to allow a rotation of a counterpart gear in a first direction, and limit a rotation of the counterpart gear in a second direction opposite to the first direction,
      a guiding gear configured to allow a rotation of a counterpart gear in the second direction and limit a rotation of the counterpart gear in the first direction,
      a first rotary gear configured to be engaged with the fixed gear,
      a second rotary gear configured to be engaged with the guiding gear, and
      an elastic member arranged between the first rotary gear and the second rotary gear, and providing an elastic force for the first rotary gear and the second rotary gear to move toward the fixed gear and the guiding gear, respectively.

2. The foldable electronic device of claim 1, wherein the hinge module further includes a shaft gear configured to pass through the fixed gear, the guiding gear, the first rotary gear, the second rotary gear, and the elastic member.

3. The foldable electronic device of claim 2, wherein the shaft gear includes a first shaft gear serving as a rotation shaft of the first housing and a second shaft gear serving as a rotation shaft of the second housing.

4. The foldable electronic device of claim 2, wherein the first rotary gear and the second rotary gear are provided to advance and retreat in an axial direction of the shaft gear.

5. The foldable electronic device of claim 4, wherein when a distance in which the first rotary gear advances and retreats with respect to the second rotary gear is g, and a height of the first rotary gear is h, the distance and the height satisfy a condition $g \geq h$.

6. The foldable electronic device of claim 4,
   wherein the first rotary gear includes a first coupling portion extending in a direction parallel to the axial direction of the shaft gear and having a cross section of an arc shape, and
   wherein the second rotary gear includes a second coupling portion extending in a direction parallel to the axial direction of the shaft gear, and configured to form a circular cross section together with the first coupling portion by being coupled to the first coupling portion in the axial direction.

7. The foldable electronic device of claim 6,
   wherein the first coupling portion includes guide protrusions formed to protrude outward from both sides of the first coupling portion, and
   wherein the second coupling portion includes guide grooves formed to be recessed inward from both sides of the second coupling portion.

8. The foldable electronic device of claim 7, wherein the guide protrusion has a cross-sectional shape that corresponds to a cross-sectional shape of the guide groove.

9. The foldable electronic device of claim 1, wherein the hinge module includes:
   a rotating member provided to rotate together with the first housing or the second housing;
   a wing member provided to rotate together with the rotating member, and including the guiding gear; and
   a transmission shaft configured pass through each of the rotating member and the wing member to transmit a rotational force of the rotating member to the wing member.

10. The foldable electronic device of claim 9,
    wherein the rotating member includes a transmission shaft hole formed to allow the transmission shaft to be inserted thereinto, and
    wherein the transmission shaft hole configured to limit a movement range of the transmission shaft such that a folding range of the first housing or the second housing is limited.

11. The foldable electronic device of claim 3, wherein the hinge module further includes a link gear arranged between the first shaft gear and the second shaft gear to transmit the rotation of the first shaft gear to the second shaft gear or transmit the rotation of the second shaft gear to the first shaft gear.

12. The foldable electronic device of claim 2,
    wherein, when the shaft gear rotates in the first direction, the first rotary gear rotates relative to the fixed gear in the first direction, and
    wherein, when the second rotary gear and the guiding gear rotate together with the first rotary gear in the first direction.

13. The foldable electronic device of claim 12,
    wherein, when the shaft gear rotates in the second direction, the fixed gear, the first rotary gear and the second rotary gear are fixed, and
    wherein, when the guiding gear rotates relative to the second rotary gear in the second direction.

14. The foldable electronic device of claim 12,
    wherein, when the first rotary gear rotates relative to the fixed gear in the first direction, and
    wherein, when the first rotary gear moves toward the second rotary gear.

15. The foldable electronic device of claim 13,
    wherein, when the guiding gear rotates relative to the second rotary gear in the second direction, and
    wherein, when the second rotary gear moves toward the first rotary gear.

16. A hinge module rotatably connecting a first housing to a second housing, the hinge module comprising:
    a fixed gear fixed without rotation and configured to allow a rotation of a counterpart gear in a first direction, and limit a rotation of the counterpart gear in a second direction opposite to the first direction;
    a guiding gear configured to allow a rotation of a counterpart gear in the second direction and limit a rotation of the counterpart gear in the first direction;

a first rotary gear configured to be engaged with the fixed gear;
a second rotary gear configured to be engaged with the guiding gear; and
an elastic member arranged between the first rotary gear and the second rotary gear, and providing an elastic force for the first rotary gear and the second rotary gear to move toward the fixed gear and the guiding gear, respectively.

17. The hinge module of claim 16,
wherein, when a shaft gear rotates in the first direction, the first rotary gear rotates relative to the fixed gear in the first direction, and
wherein, when the second rotary gear and the guiding gear rotate together with the first rotary gear in the first direction.

18. The hinge module of claim 17,
wherein, when the shaft gear rotates in the second direction, the fixed gear, the first rotary gear and the second rotary gear are fixed, and
wherein, when the guiding gear rotates relative to the second rotary gear in the second direction.

19. The hinge module of claim 17,
wherein, when the first rotary gear rotates relative to the fixed gear in the first direction, the first rotary gear moves toward the second rotary gear, and
wherein, when the guiding gear rotates relative to the second rotary gear in the second direction, the second rotary gear moves toward the first rotary gear.

20. A foldable electronic device comprising:
a first housing;
a second housing provided in a shape corresponding to a shape of the first housing; and
a hinge module rotatably connecting the first housing to the second housing, the hinge module configured to fix the first housing and the second housing at a certain opening angle,
wherein the hinge module includes:
a first fixed gear fixed without rotation and configured to allow a rotation of a counterpart gear in a first direction, and limit a rotation of the counterpart gear in a second direction opposite to the first direction,
a second fixed gear fixed together with the first fixed gear and configured to limit a rotation of a counterpart gear in the first direction, and allow a rotation of the counterpart gear in the second direction,
a first guiding gear provided to rotate together with the first housing and configured to allow a rotation of a counterpart gear in the second direction and limit a rotation of the counterpart gear in the first direction,
a second guiding gear provided to rotate together with the second housing and configured to limit a rotation of a counterpart gear in the first direction and limit a rotation of the counterpart gear in the second direction,
a first rotary gear unit including a first gear engaged with the first fixed gear, a second gear engaged with the first guiding gear, and a first elastic member arranged between the first gear and the second gear, and
a second rotary gear unit including a third gear engaged with the second fixed gear, a third gear engaged with the second guiding gear, and a second elastic member arranged between the third gear and a fourth gear.

* * * * *